(12) United States Patent  (10) Patent No.: US 9,426,797 B2
Yang et al.  (45) Date of Patent: Aug. 23, 2016

(54) METHOD FOR TRANSCEIVING CONTROL INFORMATION AND APPARATUS FOR SAME

(71) Applicant: LG ELECTRONICS INC., Seoul (KR)

(72) Inventors: Suckchel Yang, Anyang-si (KR); Joonkui Ahn, Anyang-si (KR)

(73) Assignee: LG Electronics Inc., Seoul (KR)

(*) Notice: Subject to any disclaimer, the term of this patent is extended or adjusted under 35 U.S.C. 154(b) by 27 days.

(21) Appl. No.: 14/361,384

(22) PCT Filed: Jan. 25, 2013

(86) PCT No.: PCT/KR2013/000630
§ 371 (c)(1),
(2) Date: May 29, 2014

(87) PCT Pub. No.: WO2013/112003
PCT Pub. Date: Aug. 1, 2013

(65) Prior Publication Data
US 2014/0334419 A1  Nov. 13, 2014

Related U.S. Application Data

(60) Provisional application No. 61/590,814, filed on Jan. 26, 2012.

(51) Int. Cl.
*H04W 72/04* (2009.01)
*H04W 28/04* (2009.01)
(Continued)

(52) U.S. Cl.
CPC ........... *H04W 72/042* (2013.01); *H04L 1/1671* (2013.01); *H04L 1/1861* (2013.01); *H04L 5/001* (2013.01); *H04L 5/0055* (2013.01); *H04L 2001/0093* (2013.01)

(58) Field of Classification Search
CPC .................................................. H04W 72/042
See application file for complete search history.

(56) References Cited

U.S. PATENT DOCUMENTS

2011/0165906 A1  7/2011 Papasakellariou et al.
2012/0087273 A1  4/2012 Koo et al.
(Continued)

FOREIGN PATENT DOCUMENTS

KR  1020110040672 A  4/2011
KR  1020110090783 A  8/2011
(Continued)

OTHER PUBLICATIONS

Nokia Siemens Networks, Nokia, "Cell aggregation: A unified approach to CoMP and carrier aggregation", R1-112390, 3GPP TSG-RAN WG1 Meeting #66, Athens, Greece, Aug. 22-26, 2011.
(Continued)

*Primary Examiner* — Andrew Chriss
*Assistant Examiner* — Voster Preval
(74) *Attorney, Agent, or Firm* — Dentons US LLP

(57) ABSTRACT

The present invention relates to a wireless communication system. More particularly, the present invention relates to a method and an apparatus for transmitting uplink control information in a terminal for which a coordinated multi-point (CoMP) set including a plurality of cells is constructed in a carrier aggregation-based wireless communication system. The method comprises: a step of receiving a physical downlink control channel signal (PDCCH) for uplink scheduling; step of receiving a physical downlink shared channel (PDSCH) signal corresponding to the PDCCH signal on a secondary cell (SCell); and a step of transmitting PDSCH signal acknowledgement information via a physical uplink control channel (PUCCH). In cases where the SCell belongs to the CoMP set having a primary cell (PCell), a resource for the PUCCH is provided using an index for a specific resource unit from among one or more resource units used in transmitting the PDCCH signal. In cases where the SCell does not belong to the CoMP set having a PCell, a resource for the PUCCH is provided using a value of a specific field within the PDCCH signal.

14 Claims, 10 Drawing Sheets

(a)

(b)

(51) Int. Cl.
*H04L 1/18* (2006.01)
*H04L 1/16* (2006.01)
*H04L 5/00* (2006.01)
*H04L 1/00* (2006.01)

(56) References Cited

U.S. PATENT DOCUMENTS

| | | | | |
|---|---|---|---|---|
| 2012/0113827 | A1* | 5/2012 | Yamada | H04L 1/0031 370/252 |
| 2012/0294204 | A1* | 11/2012 | Chen | H04L 5/0053 370/280 |
| 2014/0016594 | A1* | 1/2014 | Han | H04L 5/001 370/329 |
| 2014/0050113 | A1* | 2/2014 | Rosa | H04W 52/0229 370/252 |
| 2014/0161111 | A1* | 6/2014 | Kim | H04W 56/0005 370/336 |
| 2014/0286240 | A1* | 9/2014 | Kim | H04L 5/0096 370/328 |

FOREIGN PATENT DOCUMENTS

| | | |
|---|---|---|
| KR | 1020110100629 A | 9/2011 |
| WO | 2010/140872 A2 | 12/2010 |
| WO | 2011017515 A2 | 2/2011 |
| WO | 2011143636 A1 | 11/2011 |

OTHER PUBLICATIONS

Huawei, Hisilicon, "Text proposal for standard impacts and design principles of CoMP in Rel-11", R1-112785, 3GPP TSG RAN WG1 Meeting #66, Athens, Greece, Aug. 22-26, 2011.

* cited by examiner

FIG. 10
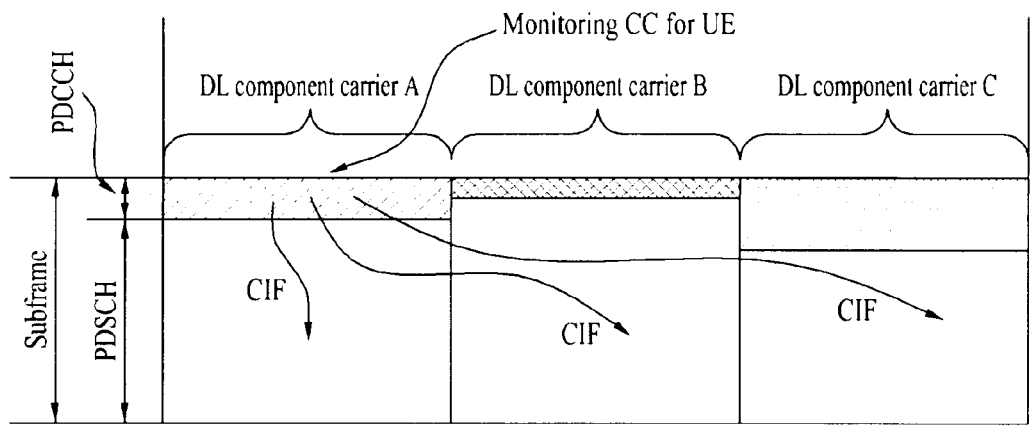
FIG. 11
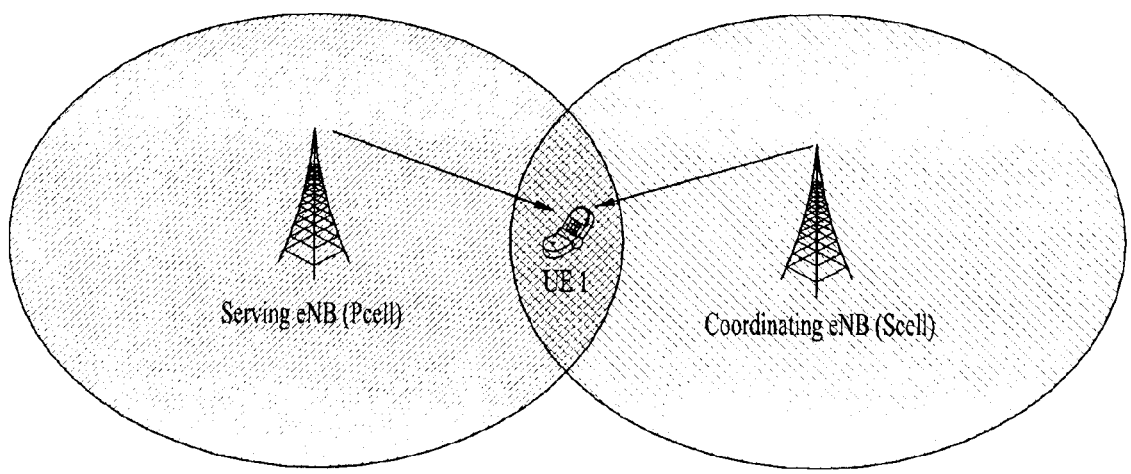
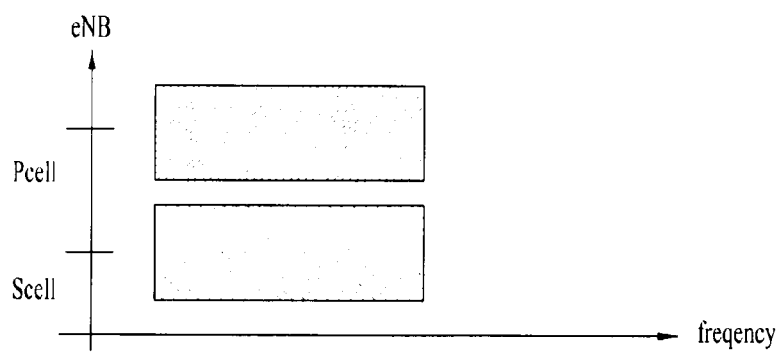

SF #n : PCell + SCell 2
SF #n+k : SCell 1 + SCell 2

TPC field of SCell 1 is used for power control
PDCCH of SCell 1 may be used to determine fallback PUCCH resource SF #n : PCell + SCell 2
SF #n+k : SCell 1 + SCell 3

TPC field of SCell 1 is used for power control
PDCCH of SCell 1 may be used to determine fallback PUCCH resource

METHOD FOR TRANSCEIVING CONTROL INFORMATION AND APPARATUS FOR SAME

This application is a 35 USC §371 National Stage entry of International Application No. PCT/KR2013/000630, filed on Jan. 25, 2013, U.S. Provisional Application No. 61/590,814, filed Jan. 26, 2012, both of which are hereby incorporated by reference in their entireties as if fully set forth herein.

TECHNICAL FIELD

The present invention relates to a wireless communication system and, more particularly, to a method for transmitting and receiving control information and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method for efficiently transmitting and receiving control information in a wireless communication system and an apparatus for the same. Another object of the present invention is to provide a method for efficiently transmitting and receiving uplink control information, preferably, ACK/NACK information in a carrier aggregation based CoMP system and an apparatus for the same. Another object of the present invention is to provide a method for efficiently transmitting and receiving resource allocation information for uplink control information in a carrier aggregation based CoMP system and an apparatus for the same.

The technical problems solved by the present invention are not limited to the above technical problems and those skilled in the art may understand other technical problems from the following description.

Technical Solution

In an aspect of the present invention, provided herein is a method for transmitting uplink control information in a user equipment (UE) configured with a coordinated multi-point (CoMP) set including a plurality of cells in a carrier aggregation (CA) based wireless communication system, the method including: receiving a physical downlink control channel (PDCCH) signal for downlink scheduling; receiving a physical downlink shared channel (PDSCH) signal corresponding to the PDCCH signal on a secondary cell (SCell); and transmitting reception response information with respect to the PDSCH signal via a physical uplink control channel (PUCCH), wherein, when the SCell belongs to a CoMP set having a primary cell (PCell), a resource for the PUCCH is given using an index for a specific resource unit from among one or more resource units used to transmit the PDCCH signal, wherein, when the SCell does not belong to the CoMP set having the PCell, the resource for the PUCCH is given using a value of a specific field included in the PDCCH signal.

Preferably, the specific field may be a transmit power control (TPC) field and, when the SCell does not belong to the CoMP set having the PCell, the specific field may indicate an ACK/NACK resource indicator (ARI) value.

Preferably, when the SCell belongs to the CoMP set having the PCell, a TPC field included in the PDCCH that schedules the SCell may include power control information.

Preferably, when the SCell belongs to the CoMP set having the PCell and reception response information with respect to one PDSCH signal transmitted on the SCell is transmitted, the number of resources for the PUCCH may equal a maximum number of transport blocks that can be transmitted in one downlink subframe through the CoMP set having the PCell.

Preferably, when the SCell belongs to the CoMP set having the PCell and acknowledgement information with respect to one or more PDSCH signals transmitted on the SCell is transmitted, resources for the PUCCH may include a PUCCH resource related to a PDCCH signal scheduling a first downlink subframe of the SCell and a PUCCH resource related to a PDCCH signal scheduling a second downlink subframe of the SCell.

Preferably, when the SCell belongs to the CoMP set having the PCell and reception response information with respect to one or more PDSCH signals transmitted on the SCell is transmitted, resources for the PUCCH may include a PUCCH resource related to a PDCCH signal scheduling the SCell while having a downlink association index (DAI) of 1 and a PUCCH resource related to a PDCCH signal scheduling the SCell while having a DAI of 2.

In another aspect of the present invention, provided herein is a user equipment (UE) configured with a coordinated multi-point (CoMP) set including a plurality of cells in a carrier aggregation (CA) based wireless communication system, the UE including: a radio frequency (RF) module; and a processor, wherein the processor is configured to receive a PDCCH signal for downlink scheduling through the RF module, to receive a PDSCH signal corresponding to the PDCCH signal on a secondary cell (SCell) through the RF module, and to transmit reception response information with respect to the PDSCH signal via a PUCCH through the RF module, wherein, when the SCell belongs to a CoMP set having a primary cell (PCell), a resource for the PUCCH is given using an index for a specific resource unit from among one or more resource units used to transmit the PDCCH signal, wherein, when the SCell does not belong to the CoMP set having the PCell, the resource for the PUCCH is given using a value of a specific field included in the PDCCH signal.

Preferably, the specific field may be a transmit power control (TPC) field and, when the SCell does not belong to the CoMP set having the PCell, the specific field may indicate an ACK/NACK resource indicator (ARI) value.

Preferably, when the SCell belongs to the CoMP set having the PCell, a TPC field included in the PDCCH that schedules the SCell may include power control information.

Preferably, when the SCell belongs to the CoMP set having the PCell and reception response information with respect to one PDSCH signal transmitted on the SCell is transmitted, the number of resources for the PUCCH may equal a maximum number of transport blocks that can be transmitted in one downlink subframe through the CoMP set having the PCell.

Preferably, when the SCell belongs to the CoMP set having the PCell and reception response information with respect to one or more PDSCH signals transmitted on the SCell is transmitted, resources for the PUCCH may include a PUCCH resource related to a PDCCH signal scheduling a first downlink subframe of the SCell and a PUCCH resource related to a PDCCH signal scheduling a second downlink subframe of the SCell.

Preferably, when the SCell belongs to the CoMP set having the PCell and reception response information with respect to one or more PDSCH signals transmitted on the SCell is transmitted, resources for the PUCCH may include a PUCCH resource related to a PDCCH signal scheduling the SCell and having a downlink association index (DAI) of 1 and a PUCCH resource related to a PDCCH signal scheduling the SCell and having a DAI of 2.

According to embodiments of the present invention, it is possible to efficiently transmit and receive control information in a wireless communication system. Specifically, it is possible to efficiently transmit and receive uplink control information, preferably, ACK/NACK information in a carrier aggregation based CoMP system. In addition, it is possible to efficiently transmit and receive resource allocation information for uplink control information in a carrier aggregation based CoMP system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 10 illustrates cross-carrier scheduling;
FIG. 11 illustrates a CA based CoMP system.

BEST MODE

Figure 1:
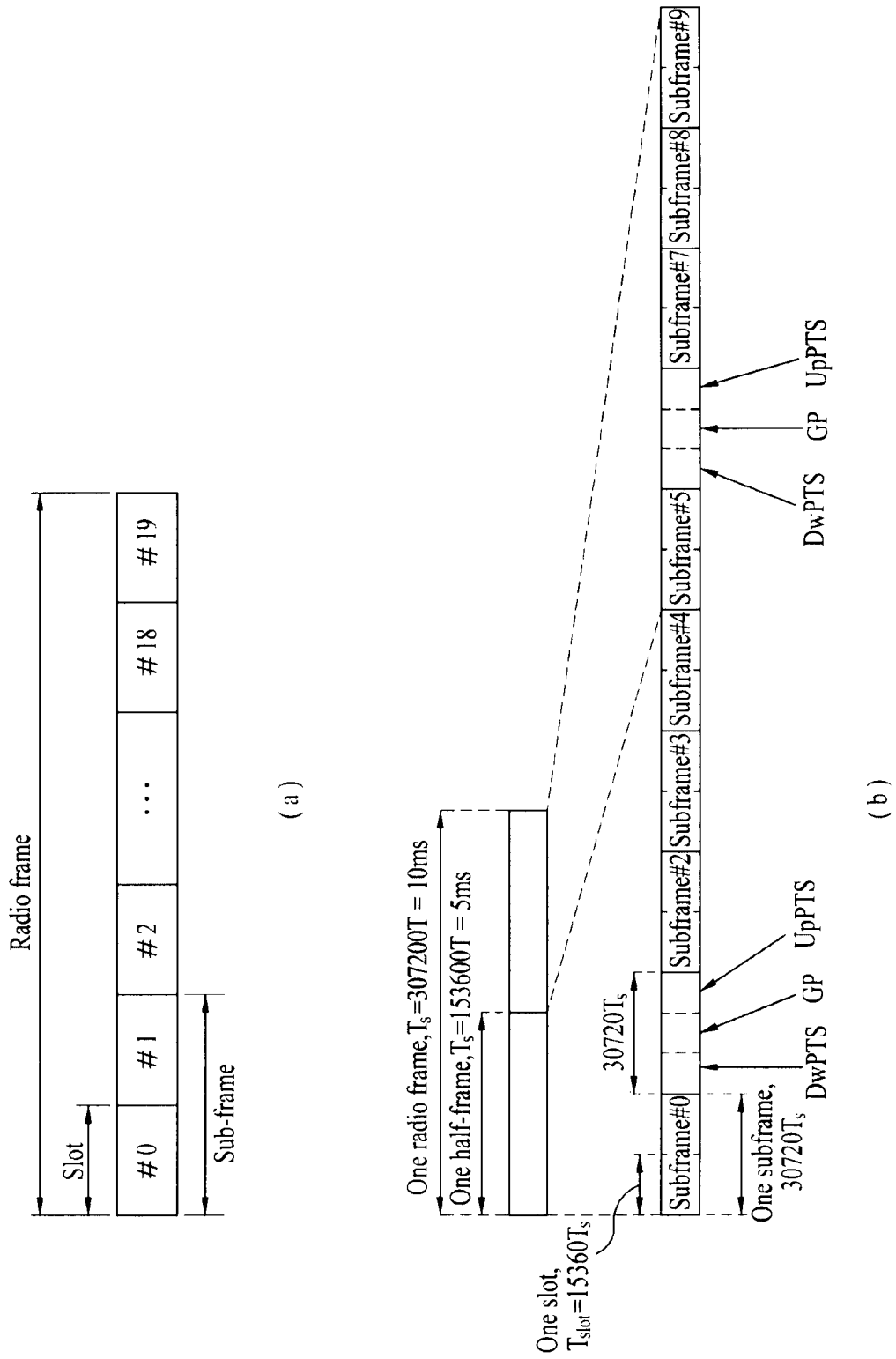
FIG. 1 illustrates a radio frame structure.

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A to clarify the description, this is purely exemplary and thus should not be construed as limiting the present invention.

The terms used in the specification will now be described.

HARQ-ACK (Hybrid Automatic Repeat request-Acknowledgement): this represents an acknowledgment response to downlink transmission (e.g. PDSCH (Physical Downlink Shared Channel) or SPS release PDCCH (Semi-Persistent Scheduling release Physical Downlink Control Channel)), that is, an ACK/NACK/DTX response (simply, ACK/NACK response, ACK/NACK). The ACK/NACK/DTX response refers to ACK, NACK, DTX or NACK/DTX. HARQ-ACK for a CC or HARQ-ACK of a CC refers to an ACK/NACK response to downlink transmission related to (e.g. scheduled for) the CC. A PDSCH can be replaced by a transport block (TB) or a codeword PDSCH: this corresponds to a DL grant PDCCH. The PDSCH is used interchangeably with a PDSCH w/PDCCH in the specification.

SPS release PDCCH: this refers to a PDCCH indicating SPS release. A UE performs uplink feedback of ACK/NACK information about an SPS release PDCCH.

SPS PDSCH: this is a PDSCH transmitted on DL using a resource semi-statically set according to SPS. The SPS PDSCH has no DL grant PDCCH corresponding thereto. The SPS PDSCH is used interchangeably with a PDSCH w/o PDCCH in the specification.

PUCCH (Physical Uplink Control Channel) index: this corresponds to a PUCCH resource. The PUCCH index indicates a PUCCH resource index, for example. The PUCCH resource index is mapped to at least one of an orthogonal cover (OC), a cyclic shift (CS) and PRB.

ARI (ACK/NACK Resource Indicator): this is used to indicate a PUCCH resource. For example, the ARI can be used to indicate a resource change value (e.g. offset) for a specific PUCCH resource (group) (configured by a higher layer). Otherwise, the ARI can be used to indicate a specific PUCCH resource (group) index in a PUCCH resource (group) set (configured by a higher layer). The ARI can be included in a TPC (Transmit Power Control) field of a PDCCH corresponding to a PDSCH on an SCC. PUCCH power control is performed through a TPC field in a PDCCH (i.e. a PDCCH corresponding to a PDSCH on a PCC) that schedules the PCC. Furthermore, the ARI can be included in a TPC field of a PDCCH other than a PDCCH that schedules a specific cell (e.g. PCell) while having a DAI (Downlink Assignment Index) initial value. The ARI is used with a HARQ-ACK resource indication value.

DAI (Downlink Assignment Index): this is included in DCI transmitted through a PDCCH. The DAI can indicate an order value or counter value of a PDCCH. A value indicated by a DAI field of a DL grant PDCCH is called a DL DAI and a value indicated by a DAI field of a UL grant PDCCH is called a UL DAI for convenience.

Implicit PUCCH resource: this represents a PUCCH resource/index linked to a lowest CCE index of a PDCCH that schedules a PCC or is transmitted through the PCC (refer to Equation 1).

Explicit PUCCH resource: this can be indicated using the ARI.

CC scheduling PDCCH: this indicates a PDCCH that schedules a PDSCH on a corresponding CC. That is, this represents the PDCCH corresponding to the PDSCH on the CC.

PCC (Primary Component Carrier) PDCCH: this indicates a PDCCH that schedules a PCC. That is, the PCC PDCCH represents a PDCCH corresponding to a PDSCH on the PCC. The PCC PDCCH is transmitted only on the PCC on the assumption that cross-carrier scheduling is not permitted. The term PCC is used interchangeably with PCell (Primary Cell).

SCC (Secondary Component Carrier) PDCCH: this indicates a PDCCH that schedules an SCC. That is, the SCC PDCCH represents a PDCCH corresponding to a PDSCH on the SCC. The SCC PDCCH can be transmitted on a CC (e.g. PCC) other than the corresponding SCC when cross-carrier scheduling is permitted for the SCC. The SCC PDCCH is transmitted only on the SCC when cross-carrier scheduling is not permitted for the SCC. The term SCC is used interchangeably with SCell (Secondary Cell).

Cross-CC scheduling: this refers to an operation of transmitting a PDCCH that schedules an SCC through a CC (e.g. PCC) other than the SCC. Cross-CC scheduling means an operation of scheduling/transmitting all PDCCHs only through a PCC when only the PCC and one SCC are present.

Non-cross-CC scheduling: this refers to an operation of scheduling/transmitting a PDCCH that schedules each CC through the corresponding CC.

FIG. 1 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. LTE(-A) supports a type-1 radio frame structure for FDD (frequency division duplex) and a type-2 radio frame structure for TDD (time division duplex).

FIG. 1(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in LTE(-A), an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. When an OFDM symbol is configured with the normal CP, for example, the number of OFDM symbols included in one slot may be 7. When an OFDM symbol is configured with the extended CP, the number of OFDM symbols included in one slot may be 6.

FIG. 1(b) illustrates a type-2 radio frame structure. The type-2 radio frame includes 2 half frames. Each half frame includes 5 subframes. One subframe consists of 2 slots.

Table 1 shows UL-DL configurations (UL-DL Cfg) of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe.

The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Table 2 shows DwPTS/GP/UpPTS lengths according to special subframe configurations. In Table 2, Ts denotes sampling time.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |

TABLE 2-continued

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
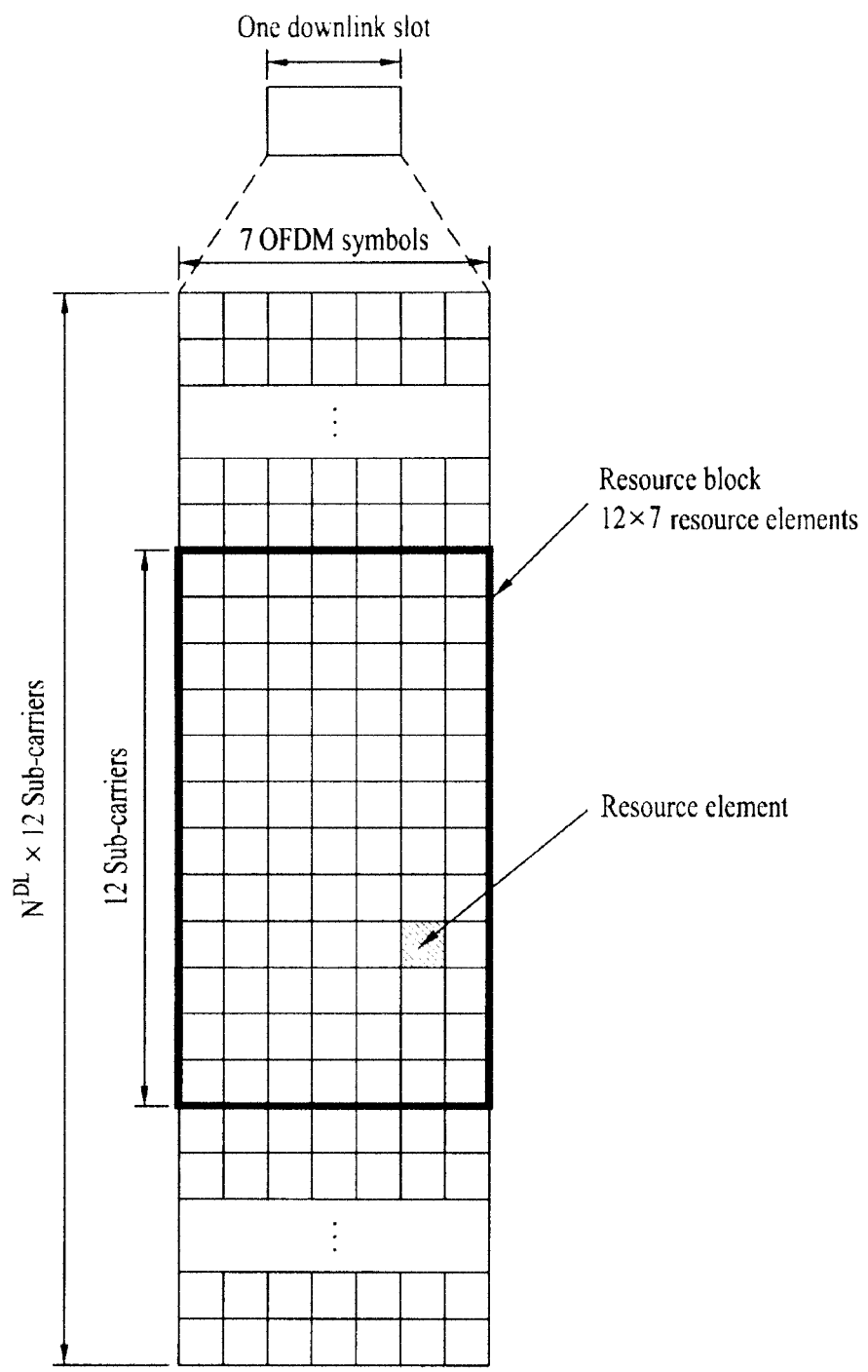
FIG. 2 illustrates a resource grid of a downlink slot.

The radio frame structure is exemplary and the number of subframes, the number of slots and the number of symbols in a radio frame can vary FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 3:
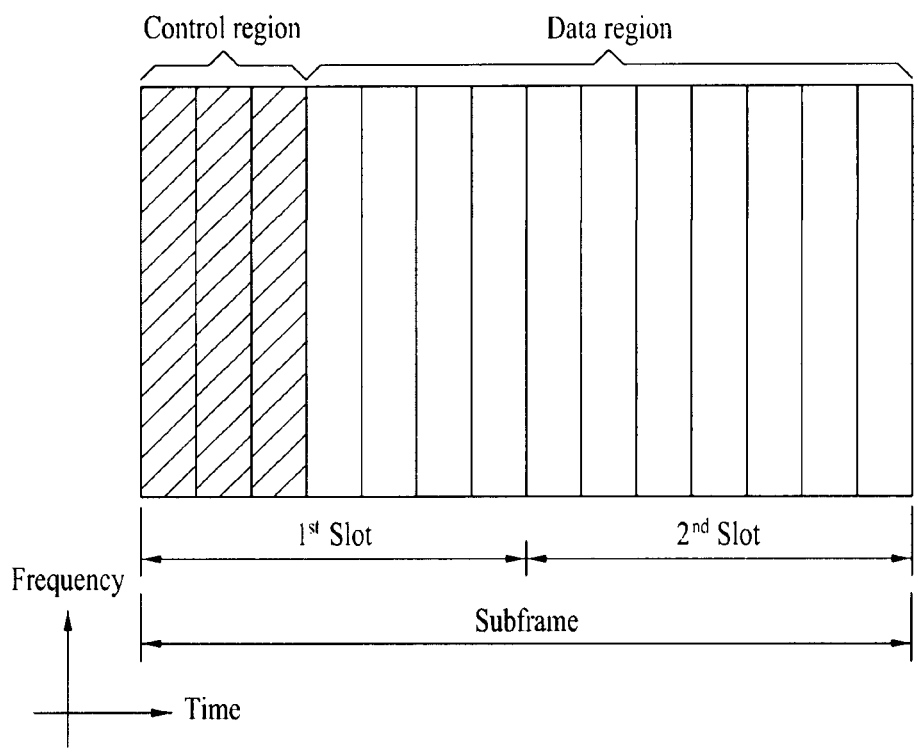
FIG. 3 illustrates a downlink subframe structure.

FIG. 3 illustrates a downlink subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/ not-acknowledgment (NACK) signal.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. The DCI formats selectively include information such as hopping flag, RB allocation, MCS (Modulation Coding Scheme), RV (Redundancy Version), NDI (New Data Indicator), TPC (Transmit Power Control), cyclic shift DM RS (Demodulation Reference Signal), CQI (Channel Quality Information) request, HARQ process number, TPMI (Transmitted Precoding Matrix Indicator), PMI (Precoding Matrix Indicator) confirmation according as necessary.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
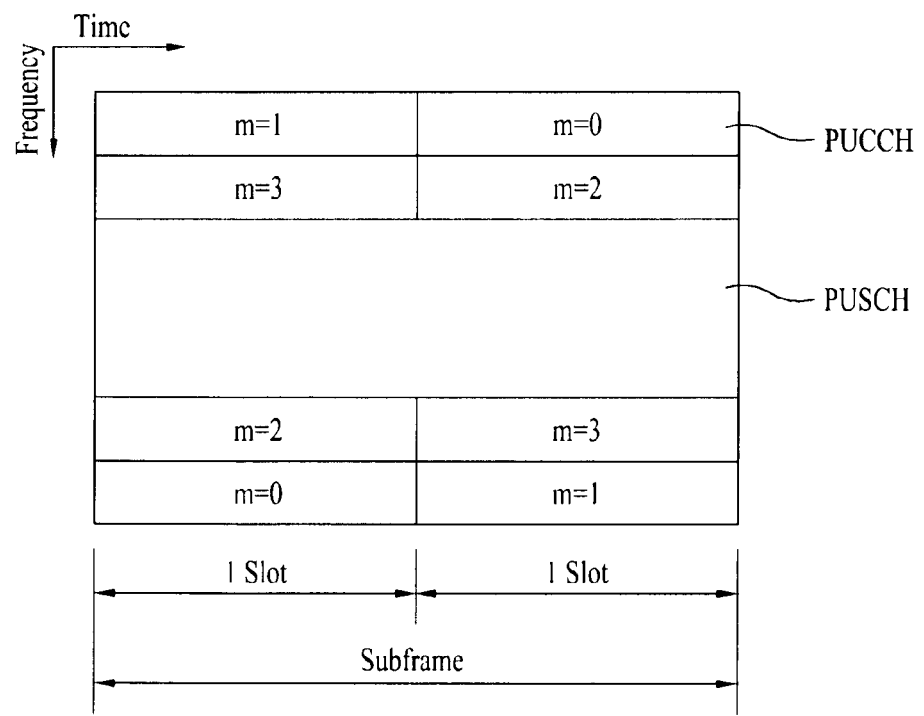
FIG. 4 illustrates an uplink subframe structure.

FIG. 4 illustrates an uplink subframe structure.

Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

Channel Quality Indicator (CQI): This is feedback information about a downlink channel. Feedback information regarding Multiple Input Multiple Output (MIMO) includes Rank Indicator (RI) and Precoding Matrix Indicator (PMI). 20 bits are used for each subframe.

Table 3 shows the mapping relationship between PUCCH formats and UCI in LTE.

TABLE 3

| PUCCH format | UCI (Uplink Control Information) |
| --- | --- |
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | HARQ ACK/NACK + SR (48 bits) |

A period and frequency in which a UE reports channel status information (CSI) (e.g. CQI) are controlled by an eNB. Periodic CSI reporting and aperiodic CSI reporting are supported in the time domain. PUCCH format 2 is used for periodic CSI reporting. While a periodic CSI report is transmitted through a PUCCH, the period CSI report is transmitted through a PUSCH if the PUSCH is scheduled for a subframe in which CSI transmitted is scheduled.

Figure 5:
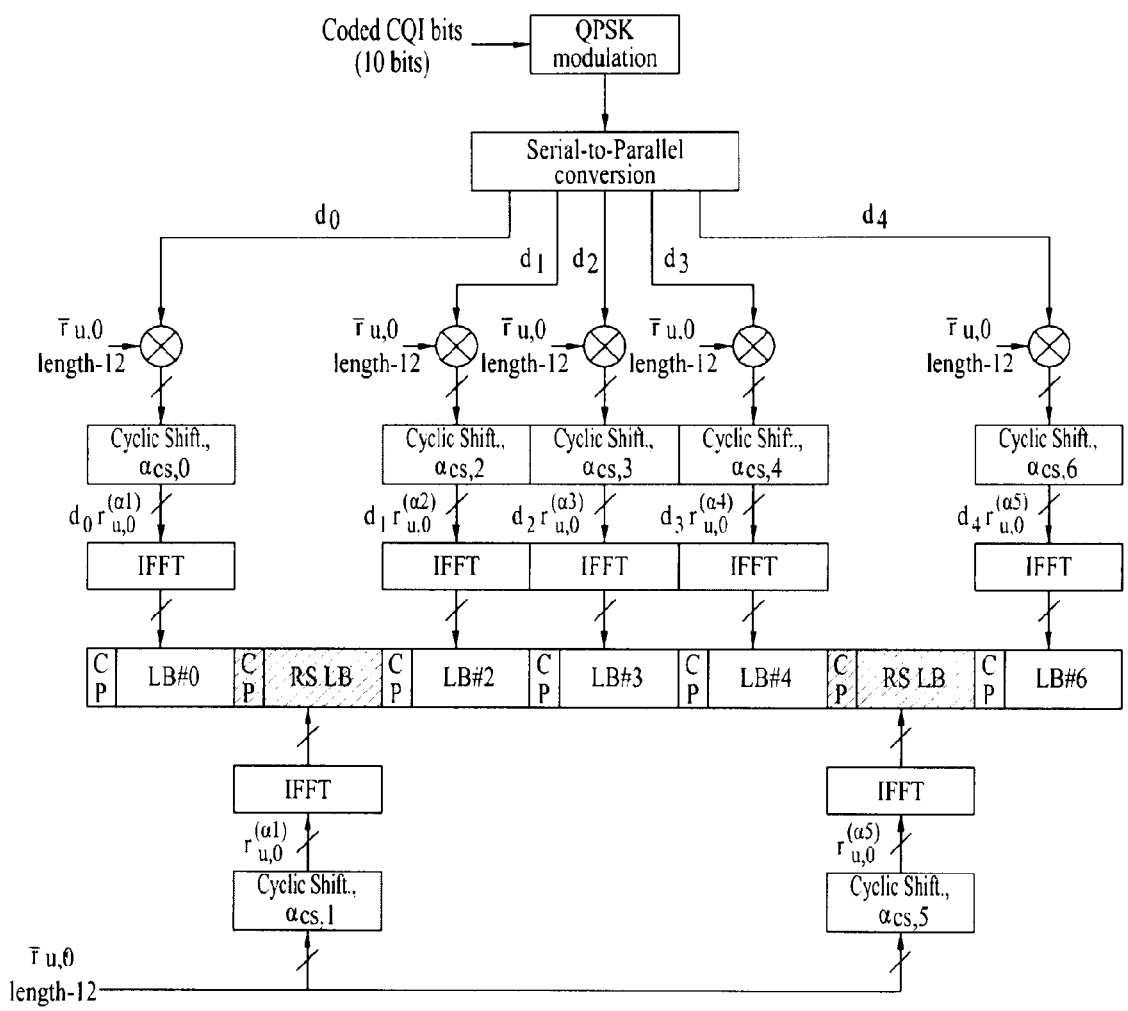
FIG. 5 illustrates slot level structure of PUCCH format 2/2a/2b.

FIG. 5 illustrates a slot level structure of PUCCH format 2/2a/2b. PUCCH format 2/2a/2b is used for CSI (e.g. CQI) transmission. SC-FDMA symbols #1 and #5 in a slot are used for demodulation reference signal (DM RS) transmission in a normal CP case. In an extended CP case, only SC-FDMA symbol #3 in the slot is used for DM RS transmission.

Referring to FIG. 5, at a subframe level, 10-bit CSI is channel-coded into 20 coded bits using (20, k) Reed-Muller code punctured at a rate of 1/2 (not shown). The coded bits are scrambled (not shown) and then mapped to quadrature phase shift keying (QPSK) constellation (QPSK modulation). Scrambling can be performed using length-31 gold sequence in a similar manner that PUSCH data is scrambled. 10 QPSK modulation symbols are generated according to the QPSK modulation, and 5 QPSK modulation symbols $d_0$, $d_1$, $d_2$, $d_3$ and $d_4$ are transmitted through SC-FDMA symbols corresponding thereto in each slot. Parameters/resources for periodic CQI reports are configured semi-statically according to higher layer (e.g. RRC) signaling. If a PUCCH resource index is set for CSI transmission, for example, CSI is periodically transmitted on a CSI PUCCH linked to the PUCCH resource index. The PUCCH resource index indicates a PUCCH RB and cyclic shift $\alpha_{cs}$.

Figure 6:
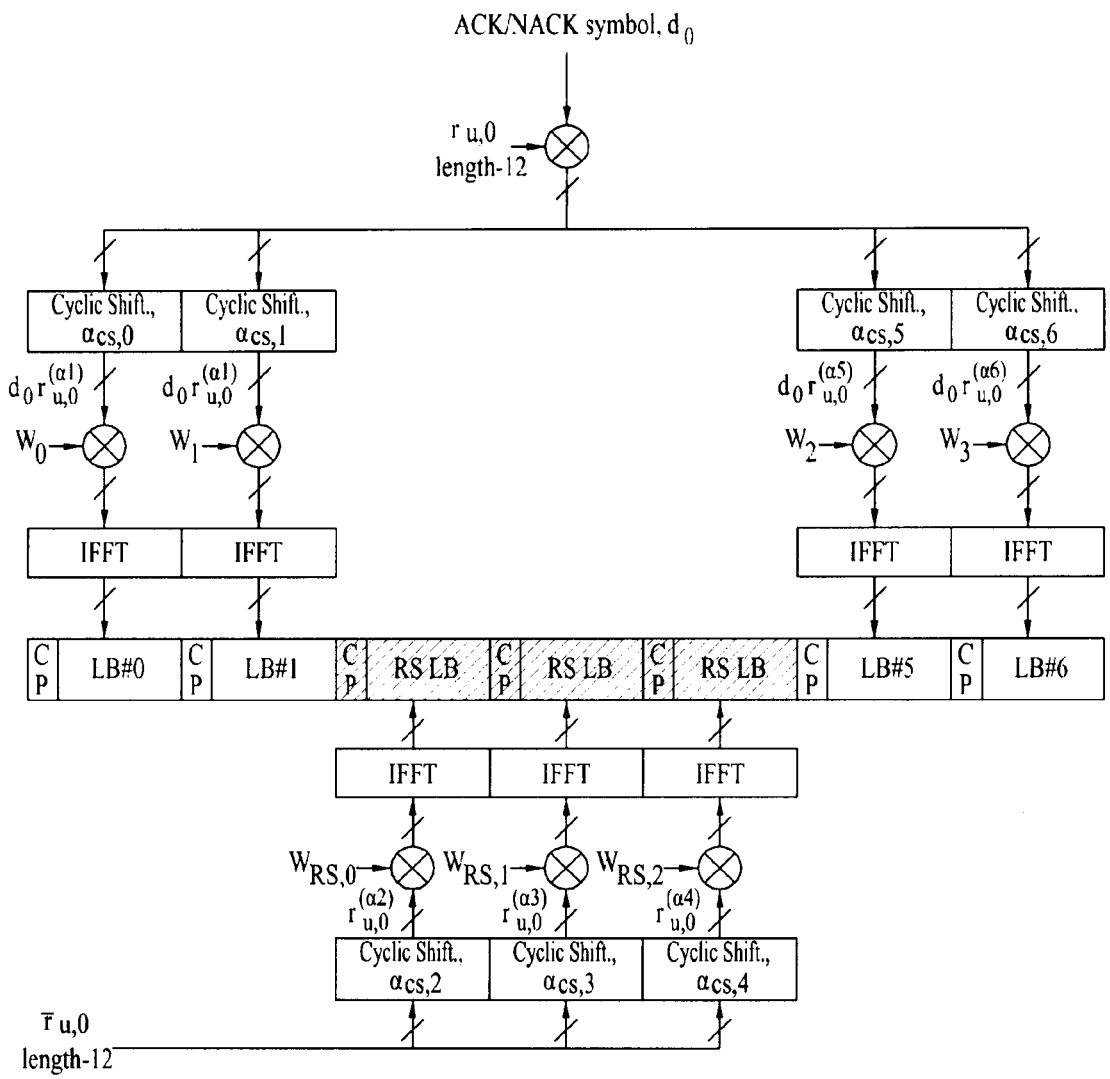
FIG. 6 illustrates slot level structure of PUCCH format 1a/1b.

FIG. 6 illustrates a slot level structure of PUCCH formats 1a/1b. The PUCCH formats 1a/1b are used for ACK/NACK transmission. In the case of normal CP, SC-FDMA symbols #2, #3 and #4 are used for DM RS transmission. In the case of extended CP, SC-FDMA symbols #2 and #3 are used for DM RS transmission. Accordingly, 4 SC-FDMA symbols in a slot are used for ACK/NACK transmission. PUCCH format 1a/1b is called PUCCH format 1 for convenience.

Referring to FIG. 6, 1-bit [b(0)] and 2-bit [b(0)b(1)] ACK/NACK information are modulated according to BPSK and QPSK modulation schemes respectively, to generate one ACK/NACK modulation symbol $d_0$. Each bit [b(i), i=0, 1] of the ACK/NACK information indicates a HARQ response to a corresponding DL transport block, corresponds to 1 in the case of positive ACK and corresponds to 0 in case of negative ACK (NACK). The PUCCH formats 1a/1b perform cyclic shift $\alpha_{cs,x}$ in the frequency domain and carries out spreading using an orthogonal spreading code $W_0$, $W_1$, $W_2$, $W_3$, (e.g. Walsh-Hadamard or DFT code) in the time domain. A larger number of UEs can be multiplexed on the same PUCCH RB because code multiplexing is used in both frequency and time domains.

Figure 7:
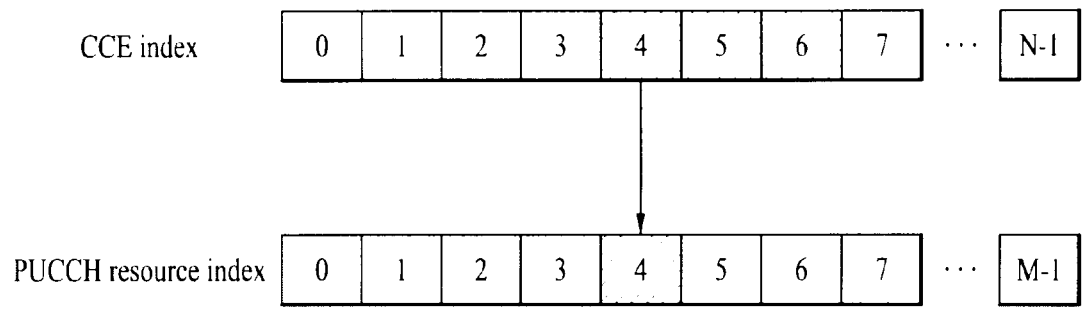
FIG. 7 illustrates an example of determining a PUCCH resource for ACK/NACK.

FIG. 7 illustrates an example of determining PUCCH resources for ACK/NACK. In LTE(-A), a plurality of PUCCH resources for ACK/NACK are shared by a plurality of UEs in a cell every time the UEs need the PUCCH resources rather than allocated to UEs in advance. Specifically, a PUCCH resource used by a UE to transmit an ACK/NACK signal corresponds to a PDCCH on which scheduling information on DL data involving the ACK/NACK signal is delivered or a PDCCH that indicates SPS release. A PDCCH transmitted in a DL subframe to the UE is composed of a plurality of control channel elements (CCEs). The UE can transmit ACK/NACK through a PUCCH resource corresponding to a specific one (e.g. first CCE) of the CCEs constituting the received PDCCH.

Referring to FIG. 7, each block in a Downlink Component Carrier (DL CC) represents a CCE and each block in an Uplink Component Carrier (UL CC) indicates a PUCCH resource. Each PUCCH index corresponds to a PUCCH resource for an ACK/NACK signal. If information on a PDSCH is delivered on a PDCCH composed of CCEs #4, #5 and #6, as shown in FIG. 6, a UE transmits an ACK/NACK signal on PUCCH #4 corresponding to CCE #4, the first CCE of the PDCCH.

Specifically, a PUCCH resource index in LTE(-A) is determined as follows.

$$n_{PUCCH}^{(1)} = n_{CCE} + N_{PUCCH}^{(1)} \quad \text{[Equation 1]}$$

Here, $n^{(1)}_{PUCCH}$ represents a resource index of PUCCH format 1a/1b for ACK/NACK/DTX transmission, $N^{(1)}_{PUCCH}$ denotes a signaling value received from a higher layer, and $n_{CCE}$ denotes the smallest value of CCE indexes used for PDCCH transmission. A cyclic shift, an orthogonal spreading code and a Physical Resource Block (PRB) for PUCCH formats 1a/1b are obtained from $n^{(1)}_{PUCCH}$.

Figure 8:
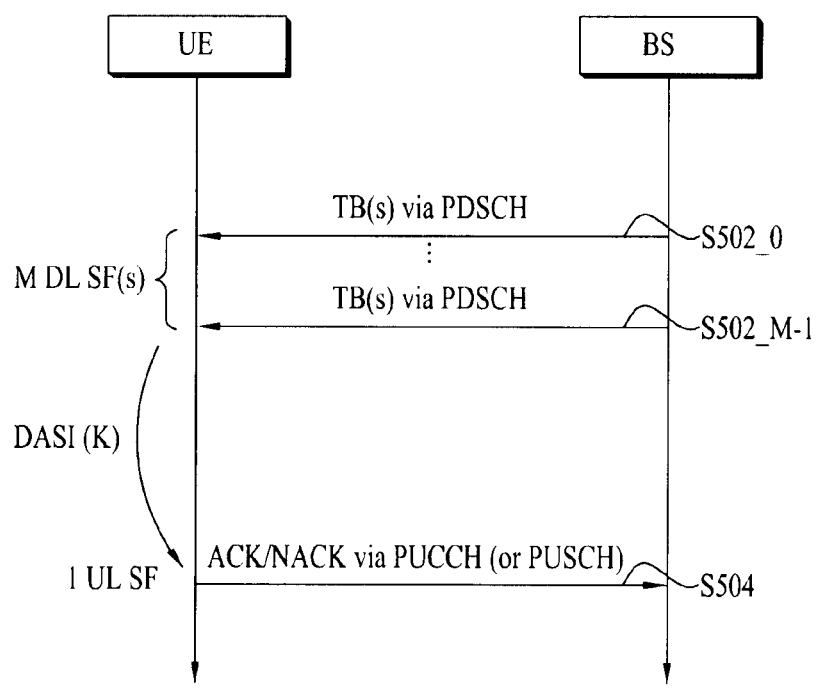
FIG. 8 illustrates a TDD UL ACK/NACK (Uplink Acknowledgement/Negative Acknowledgement) transmission procedure in a single cell situation.

FIG. 8 illustrates a TDD UL ACK/NACK transmission process in a single cell situation.

Referring to FIG. 8, a UE can receive one or more DL signals (e.g. PDSCH signals) in M DL subframes (SFs) (S502_0 to S502_M−1). Each PDSCH signal is used to transmit one or more (e.g. 2) transport blocks (TBs) (or codewords) according to transmission mode. A PDCCH signal requiring an ACK/NACK response, for example, a PDCCH signal indicating SPS (semi-persistent scheduling) release (simply, SPS release PDCCH signal) may also be received in step S502_0 to S502_M−1, which is not shown. When a PDSCH signal and/or an SPS release PDCCH signal are present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically (refer to FIGS. 5 and 6), ACK/NACK can be transmitted through a PUSCH when a PUSCH is transmitted at ACK/NACK transmission time. Various PUCCH formats shown in Table 3 can be used for ACK/NACK transmission. To reduce the number of transmitted ACK/NACK bits, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 4 shows DASI (K: {k0, k1, . . . , $k_{M-1}$}) defined in LTE(-A). Table 4 shows spacing between a UL subframe transmitting ACK/NACK and a DL subframe relating to the UL subframe. Specifically, when a PDCCH that indicates PDSCH transmission and/or (downlink) SPS release is present in a subframe n−k (k∈K), the UE transmits ACK/NACK in a subframe n.

TABLE 4

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In TDD operation, the UE needs to transmit an ACK/NACK signal for one or more DL signals (e.g. PDSCH) received through M DL SFs through one UL SF. Transmission of ACKs/NACKs for a plurality of DL SFs through one UL SF is performed according to the following methods.

1) ACK/NACK bundling: ACK/NACK bits for a plurality of data units (e.g. PDSCH, SPS release PDCCH, etc.) are combined according to a logical operation (e.g. logical AND operation). For example, upon successful decoding of all data units, a receiver (e.g. UE) transmits ACK signals. If any of data units has not been decoded (detected), the receiver does not transmit a NACK signal or no signal.

2) Channel selection: Upon reception of a plurality of data units (e.g. PDSCH, SPS release PDCCH, etc.), a UE occupies a plurality of PUCCH resources for ACK/NACK transmission. ACK/NACK responses to the plurality of data units are discriminated according to combinations of PUCCH resources used for ACK/NACK transmission and transmitted ACK/NACK information (e.g. bit values, QPSK symbol values). Channel selection is also called ACK/NACK selection and PUCCH selection.

When a UE transmits an ACK/NACK signal to an eNB in TDD, the following problem may occur.

When the UE has missed some of PDCCHs transmitted from the eNB in a plurality of subframes, an error may be generated when the UE generates ACK/NACK since the UE cannot be aware of transmission of a PDSCH corresponding to the missed PDCCH thereto.

To solve this problem, a downlink assignment index (DAI) is included in a PDCCH in a TDD system. The DAI refers to an accumulation value (i.e. counting value) of PDCCHs corresponding to PDSCHs and PDCCHs indicating downlink SPS release until the current subframe in DL subframes n−k (k ⊂ K). For example, when three DL subframes correspond to a single UL subframe, PDSCHs transmitted in the three DL subframes are sequentially indexed (i.e. sequentially counted) and transmitted on PDCCHs that schedule the PDSCHs. The UE can recognize whether previous PDCCHs have been successfully received from DAI information included in the PDCCHs.

Figure 9:
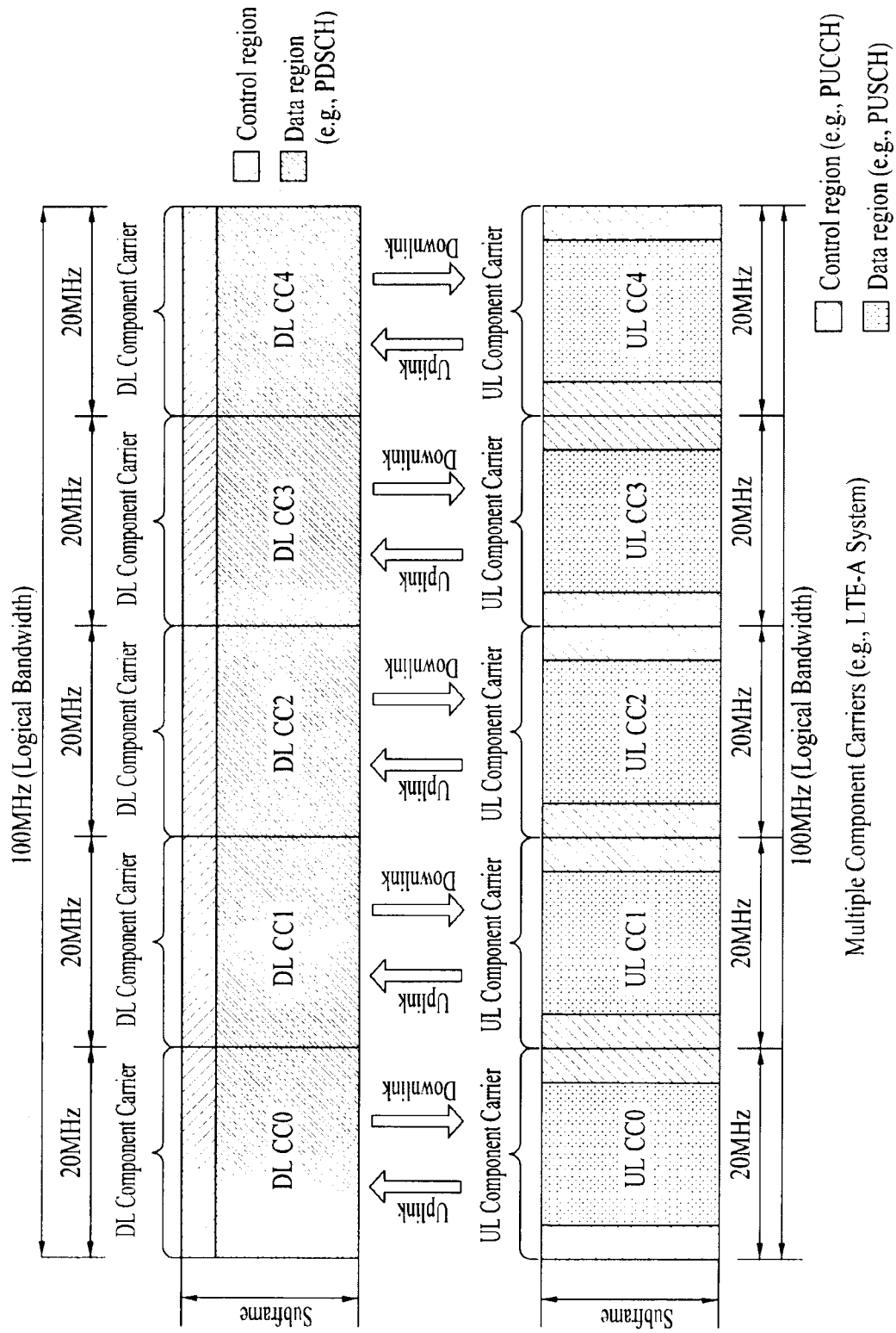
FIG. 9 illustrates a carrier aggregation (CA) communication system.

FIG. 9 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 9, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to L (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

When cross-carrier scheduling (or cross-CC scheduling) is applied, a PDCCH for downlink allocation can be transmitted on DL CC #0 and a PDSCH corresponding thereto can be transmitted on DL CC #2. For cross-CC scheduling, introduction of a carrier indicator field (CIF) can be considered. Presence or absence of the CIF in a PDCCH can be determined by higher layer signaling (e.g. RRC signaling) semi-statically and UE-specifically (or UE group-specifically). The baseline of PDCCH transmission is summarized as follows.
   CIF disabled: a PDCCH on a DL CC is used to allocate a PDSCH resource on the same DL CC or a PUSCH resource on a linked UL CC.
   CIF enabled: a PDCCH on a DL CC can be used to allocate a PDSCH or PUSCH resource on a specific DL/UL CC from among a plurality of aggregated DL/UL CCs using the CIF.

When the CIF is present, the BS can allocate a PDCCH monitoring DL CC to reduce BD complexity of the UE. The PDCCH monitoring DL CC set includes one or more DL CCs as parts of aggregated DL CCs and the UE detects/decodes a PDCCH only on the corresponding DL CCs. That is, when the BS schedules a PDSCH/PUSCH for the UE, a PDCCH is transmitted only through the PDCCH monitoring DL CC set. The PDCCH monitoring DL CC set can be set in a UE-specific, UE-group-specific or cell-specific manner. The term "PDCCH monitoring DL CC" can be replaced by the terms such as "monitoring carrier" and "monitoring cell". The term "CC" aggregated for the UE can be replaced by the terms such as "serving CC", "serving carrier" and "serving cell".

FIG. 10 illustrates scheduling when a plurality of carriers is aggregated. It is assumed that 3 DL CCs are aggregated and DL CC A is set to a PDCCH CC. DL CC A, DL CC B and DL CC C can be called serving CCs, serving carriers, serving cells, etc. In case of CIF (Carrier Indicator Field) disabled, a DL CC can transmit only a PDCCH that schedules a PDSCH corresponding to the DL CC without a CIF (non-cross-CC scheduling). When the CIF is enabled according to UE-specific (or UE-group-specific or cell-specific) higher layer signaling, a specific CC (e.g. DL CC A) can transmit not only a PDCCH that schedules the PDSCH corresponding to the DL CC A but also PDCCHs that schedule PDSCHs of other DL CCs using the CIF (cross-CC scheduling). A PDCCH is not transmitted in DL CC B/C.

A specific CC (or cell) used to transmit a PDCCH is referred to as a scheduling CC (or cell) or monitoring CC (or cell). A CC (or cell) in which a PDSCH/PUSCH is scheduled by a PDCCH of another CC is referred to as a scheduled CC (or cell). One or more scheduling CCs can be configured for one UE and one of the scheduling CCs can be used for DL control signaling and UL PUCCH transmission. That is, a PCC is included in the scheduling CC and the PCC is equivalent to the scheduling CC when only one scheduling CC is present.

CCs through which signals are transmitted are defined according to signal type as follows when cross-CC scheduling is set.
   PDCCH (UL/DL grant): scheduling CC
   PDSCH/PUSCH: CC indicated by CIF of a PDCCH detected from a scheduling CC
   DL ACK/NACK (e.g. PHICH): scheduling CC (e.g. DL PCC)
   UL ACK/NACK (e.g. PUCCH): UL PCC LTE-A considers transmission of a plurality of ACK/NACK information/signals for a plurality of PDSCHs, transmitted through a plurality of CCs, through a specific UL CC. To achieve this, a plurality of ACK/NACK information/signals is joint-coded (e.g. Reed-Muller coding, Tail-biting convolutional coding, etc.) and then transmitted using PUCCH format 3, distinguished from a conventional scheme in which ACK/NACK is transmitted using PUCCH format 1a/1b in LTE. PUCCH format 3 is based on block spreading. ACK/NACK transmission using PUCCH format 3 is exemplary and PUCCH format 3 can be used to transmit ACK/NACK, CSI (e.g. CQI, PMI, RI, PTI, etc.), SR or to simultaneously transmit two or more thereof.

Resources for PUCCH format 3 can be explicitly provided. Specifically, a PUCCH resource set can be configured through a higher layer (e.g. RRC) and a PUCCH resource which will be actually used can be indicated using an ACK/NACK resource indicator (ARI) of a PDCCH.

Table 5 shows an example of explicitly indicating a PUCCH resource for HARQ-ACK.

TABLE 5

| Value (ARI) of HARQ-ACK resource for PUCCH | $n_{PUCCH}$ |
| --- | --- |
| 00 | Value of a first PUCCH resource configured by a higher layer |
| 01 | Value of a second PUCCH resource configured by a higher layer |
| 10 | Value of a third PUCCH resource configured by a higher layer |
| 11 | Value of a fourth PUCCH resource configured by a higher layer |

ARI: ACK/NACK resource indicator. In table 2, the higher layer includes the RRC layer and an ARI value can be indicated by a PDCCH carrying a DL grant. For example, an ARI value can be indicated using a transmit power control (TPC) field of an SCell PDCCH and/or at least one PCell PDCCH which does not correspond to an initial DAI value.

In FDD LTE-A, transmission of a plurality of ACK/NACK information/signals using PUCCH format 1a/1b and ACK/NACK multiplexing (i.e. ACK/NACK channel selection), which was used in LTE TDD, in a multi-carrier situation is under discussion. In LTE TDD, implicit ACK/NACK selection using a PUCCH resource corresponding to each PDCCH that schedules each PDSCH (i.e. a PUCCH resource linked to a lowest CCE index or PUCCH resources linked to $n_{CCE}$ and $n_{CCE+1}$) is used as an ACK/NACK multiplexing (i.e. ACK/NACK channel selection) method in order to secure PUCCH resources. However, when implicit ACK/NACK selection using PUCCH resources in different RBs is applied, performance deterioration may occur. Accordingly, in LTE-A, explicit ACK/NACK selection using a PUCCH resource reserved for each UE through RRC signaling, preferably, a plurality of PUCCH resources in the same RB or in neighboring RBs is under discussion.

An example of explicitly indicating a PUCCH resource for HARQ-ACK is shown in Table 5. Specifically, a PUCCH resource set can be configured through a higher layer (e.g. RRC) and a PUCCH resource which will be actually used can be indicated using an ARI of a PDCCH. An ARI value can be indicated using a TPC field of a PDCCH corresponding to a PDSCH on an SCell. However, the present invention is not limited thereto. ARI is used interchangeably with a HARQ-ACK resource indication value.

In LTE-A, a mapping table for ACK/NACK channel selection is designed under the following conditions.
   (1) Full implicit PUCCH resource indication is supported. An implicit PUCCH resource refers to a PUCCH resource linked to a specific CCE (e.g. first CCE) from among one or more CCEs constituting a DL grant PDCCH (refer to Equation 1).
   (2) LTE fallback is supported. LTE fallback refers to a scheme in which a PUCCH format used for ACK/NACK transmission and a modulation symbol transmitted through the PUCCH format conform to definition of LTE when serving cells (i.e. SCells) other than a PCell correspond to NACK/

DTX. Mapping of an ACK/NACK state and a modulation symbol is determined on the basis of ACK/NACK for the PCell.

(3) Worst ACK/NACK bit performance and average performance are improved to achieve individual ACK/NACK bit performance equalization.

Table 6 shows the relationship between transport blocks of a serving cell and HARQ-ACK in 2 to 4-bit ACK/NACK channel selection.

TABLE 6

| | HARQ-ACK(j) | | | |
|---|---|---|---|---|
| | HARQ-ACK(0) | HARQ-ACK(1) | HARQ-ACK(2) | HARQ-ACK(3) |
| 2 bits | TB1 PCell | TB1 SCell | NA | NA |
| 3 bits | TB1 serving cell #1 | TB2 serving cell #1 | TB1 serving cell #2 | NA |
| 4 bits | TB1 PCell | TB2 PCell | TB1 SCell | TB2 SCell |

Table 7 shows a mapping table for 2-bit A/N channel selection. 2-bit A/N channel selection is based on the assumption that 2 serving cells are aggregated. PUCCH resource 0 can be implicitly signaled. For example, PUCCH resource 0 can be linked to a CCE (e.g. a lowest CCE index) constituting a DL grant PDCCH corresponding to a PDSCH of the PCell (refer to Equation 1). PUCCH resource 1 can be linked to a CCE (e.g. a lowest CCE index) constituting a DL grant PDCCH corresponding to a PDSCH of an SCell (in the case of cross-CC scheduling, for example) or explicitly signaled by RRC (in the case of non-cross-CC scheduling, for example).

TABLE 7

| HARQ-ACK(0) | HARQ-ACK(1) | $n_{PUCCH,i}^{(1)}$ | b(0)b(1) |
|---|---|---|---|
| ACK | ACK | $n_{PUCCH,1}^{(1)}$ | 1, 1 |
| ACK | NACK/DTX | $n_{PUCCH,0}^{(1)}$ | 1, 1 |
| NACK/DTX | ACK | $n_{PUCCH,1}^{(1)}$ | 0, 0 |
| NACK | NACK/DTX | $n_{PUCCH,0}^{(1)}$ | 0, 0 |
| DTX | NACK/DTX | | No Transmission |

In Table 7, $n_{PUCCH,i}^{(1)}$ (i=0, 1) denotes PUCCH resource indexes corresponding to PUCCH resources 0 and 1 and b(0)b(1) denotes a bit value corresponding to a complex modulation value of Table 9.

Referring to Table 7, upon reception of one or more PDSCHs from the eNB, the UE generates HARQ-ACK(0) and HARQ-ACK(1) corresponding to the PDSCHs. The UE selects PUCCH resources (e.g. $n_{PUCCH,i}^{(1)}$) corresponding to HARQ-ACK(0) and HARQ-ACK(1) and transmits a corresponding bit value (or modulation value) to the eNB through the selected PUCCH resources.

Table 8 shows a mapping table for 3-bit A/N channel selection. 3-bit A/N channel selection corresponds to a case in which 2 serving cells or 3 serving cells are aggregated.

TABLE 8

| HARQ-ACK(0) | HARQ-ACK(1) | HARQ-ACK(2) | $n_{PUCCH,i}^{(1)}$ | b(0)b(1) |
|---|---|---|---|---|
| ACK | ACK | ACK | $n_{PUCCH,1}^{(1)}$ | 1, 1 |
| ACK | NACK/DTX | ACK | $n_{PUCCH,1}^{(1)}$ | 1, 0 |
| NACK/DTX | ACK | ACK | $n_{PUCCH,1}^{(1)}$ | 0, 1 |
| NACK/DTX | NACK/DTX | ACK | $n_{PUCCH,2}^{(1)}$ | 1, 1 |
| ACK | ACK | NACK/DTX | $n_{PUCCH,0}^{(1)}$ | 1, 1 |
| ACK | NACK/DTX | NACK/DTX | $n_{PUCCH,0}^{(1)}$ | 1, 0 |
| NACK/DTX | ACK | NACK/DTX | $n_{PUCCH,0}^{(1)}$ | 0, 1 |

TABLE 8-continued

| HARQ-ACK(0) | HARQ-ACK(1) | HARQ-ACK(2) | $n_{PUCCH,i}^{(1)}$ | b(0)b(1) |
|---|---|---|---|---|
| NACK/DTX | NACK/DTX | NACK | $n_{PUCCH,2}^{(1)}$ | 0, 0 |
| NACK | NACK/DTX | DTX | $n_{PUCCH,0}^{(1)}$ | 0, 0 |
| NACK/DTX | NACK | DTX | $n_{PUCCH,0}^{(1)}$ | 0, 0 |
| DTX | DTX | DTX | | No Transmission |

When the PCell is set to a spatial division multiplexing (SDM) mode, PUCCH resources 0 and 1 are implicitly signaled. For example, PUCCH resources 0 and 1 can be respectively linked to CCEs (e.g. a lowest CCE index and lowest CCE index+1) which constitute a DL grant PDCCH corresponding to a PDSCH of the PCell (refer to Equation 1). PUCCH resource 2 can be linked to a CCE (e.g. a lowest CCE index) constituting a DL grant PDCCH corresponding to a PDSCH of an SCell (in the case of cross-CC scheduling, for example) or explicitly signaled by RRC (in the case of non-cross-CC scheduling, for example).

When the PCell is set to non-SDM, PUCCH resource 2 can be linked to a CCE (e.g. a lowest CCE index) constituting a DL grant PDCCH corresponding to a PDSCH of the PCell. PUCCH resources 0 and 1 can be respectively linked to CCEs (e.g. a lowest CCE index and lowest CCE index+1) which constitute a DL grant PDCCH corresponding to a PDSCH of an SCell (in the case of cross-CC scheduling, for example) or explicitly signaled by RRC (in the case of non-cross-CC scheduling, for example).

In Table 8, $n_{PUCCH,i}^{(1)}$ (i=0, 1, 2) denotes PUCCH resource indexes corresponding to PUCCH resources 0, 1 and 2 and b(0)b(1) denotes a bit value corresponding to a complex modulation value.

Referring to Table 8, upon reception of one or more PDSCHs from the eNB, the UE generates HARQ-ACK(0), HARQ-ACK(1) and HARQ-ACK(2) corresponding to the PDSCHs. The UE selects PUCCH resources (e.g. $n_{PUCCH,i}^{(1)}$) corresponding to HARQ-ACK(0), HARQ-ACK(1) and HARQ-ACK(2) and transmits a corresponding bit value (or modulation value) to the eNB through the selected PUCCH resources.

Table 9 shows a mapping table for 4-bit A/N channel selection. 4-bit A/N channel selection corresponds to a case in which 2, 3 or 4 serving cells are aggregated. For example, when 2 SDM cells are aggregated, HARQ-ACK(0), HARQ-ACK(1), HARQ-ACK(2) and HARQ-ACK(3) respectively correspond to PCell TB1, PCell TB2, SCell TB1 and SCell TB2 in Table 13.

TABLE 9

| HARQ-ACK(0) | HARQ-ACK(1) | HARQ-ACK(2) | HARQ-ACK(3) | $n_{PUCCH,i}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| ACK | NACK/DTX | ACK | NACK/DTX | $n_{PUCCH,2}^{(1)}$ | 0, 0 |
| NACK/DTX | ACK | ACK | NACK/DTX | $n_{PUCCH,1}^{(1)}$ | 0, 0 |

TABLE 9-continued

| HARQ-ACK(0) | HARQ-ACK(1) | HARQ-ACK(2) | HARQ-ACK(3) | $n_{PUCCH,i}^{(1)}$ | b(0)b(1) |
|---|---|---|---|---|---|
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK/DTX | NACK | NACK/DTX | NACK/DTX | $n_{PUCCH,0}^{(1)}$ | 0, 0 |
| NACK | NACK/DTX | NACK/DTX | NACK/DTX | $n_{PUCCH,0}^{(1)}$ | 0, 0 |
| DTX | DTX | NACK/DTX | NACK/DTX | No Transmission | |

When SDM PCell+SDM SCell are assumed, PUCCH resource 0 can be implicitly signaled. For example, PUCCH resources 0 and 1 can be linked to CCEs (e.g. a lowest CCE index and lowest CCE index+1) which constitute a DL grant PDCCH corresponding to a PDSCH of the PCell (refer to Equation 1). PUCCH resources 2 and 3 can be linked to CCEs (e.g. a lowest CCE index and lowest CCE index+1) which constitute a DL grant PDCCH corresponding to a PDSCH of an SCell (in the case of cross-CC scheduling, for example) or explicitly signaled by RRC (in the case of non-cross-CC scheduling, for example).

In Table 9, denotes PUCCH resource indexes corresponding to PUCCH resources 0, 1, 2 and 3 and b(0)b(1) denotes a bit value corresponding to a complex modulation value of Table 13 (refer to QPSK modulation of Table 2). $n_{PUCCH,i}^{(1)}$ (i=0, 1, 2, 3) can depend on serving cell configuration. For example, when the PCell is set to a transmission mode supporting transmission of a single transport block, $n_{PUCCH,i}^{(1)}$ can be linked to the first CCE index from among CCE indexes corresponding to CCEs which constitute a PDCCH corresponding to a PDSCH of the PCell (refer to Equation 1). In this case, $n_{PUCCH,i}^{(1)}$ (i=0, 1, 2, 3) can be linked to the first CCE index (and second CCE index) with respect to a PDCCH corresponding to a PDSCH of an SCell corresponding to HARQ-ACK(1)(2)(3) (in the case of cross-CC scheduling, for example) or explicitly provided by a higher layer (in the case of non-cross-CC scheduling, for example). When the PCell is set to a transmission mode supporting transmission of two transport blocks, $n_{PUCCH,0}^{(1)}$ and $n_{PUCCH,1}^{(1)}$ can be respectively linked to the first CCE index and second CCE index with respect to a PDCCH corresponding to a PDSCH of the PCell. In this case, $n_{PUCCH,2}^{(1)}$ and $n_{PUCCH,3}^{(1)}$ can be linked to the first CCE index (and second CCE index) with respect to a PDCCH corresponding to a PDSCH of an SCell corresponding to HARQ-ACK(2)(3) (in the case of cross-CC scheduling, for example) or explicitly provided by a higher layer (in the case of non-cross-CC scheduling, for example).

Referring to Table 9, upon reception of one or more PDSCHs from the eNB, the UE generates HARQ-ACK(0)(1)(2)(3) corresponding to the PDSCHs. The UE selects $n^W$ PUCCH resources (e.g. $n_{PUCCH,i}^{(1)}$) corresponding to HARQ-ACK(0)(1)(2)(3) and transmits a corresponding bit value (or modulation value) to the eNB through the selected PUCCH resources.

FIG. 11 illustrates a CA based CoMP system. A coordinated multi-point (CoMP) system will now be described first.

CoMP (which may be referred to as co-MIMO, collaborative MIMO or network MIMO) is proposed by demands for improved system performance of 3GPP LTE-A. CoMP can improve the system performance and average sector throughput of a UE located at a cell edge.

In a multi-cell environment in which a frequency reuse factor is 1, the performance and average sector throughput of a UE located at a cell edge may decrease due to inter-cell interference (ICI). To reduce ICI, a method of allowing a UE located at a cell edge to have appropriate throughput performance in an environment where interference is applied to the UE using a simple passive technique such as fractional frequency reuse (FFR) through UE-specific power control is applied in LTE. However, it may be desirable to reduce ICI or to reuse ICI as a signal that the UE desires rather than decreasing frequency resource use per cell. To achieve this, CoMP can be applied.

CoMP applicable to downlink may include joint transmission (JT), coordinated scheduling/beamforming (CS/CB) and dynamic cell selection (DCS).

JT refers to a scheme through which downlink signals (e.g. PDSCH, PDCCH, etc.) are simultaneously transmitted from a plurality of points (some or all points (e.g. eNB) participating in CoMP operation). That is, data may be simultaneously transmitted to a single UE from a plurality of transmission points. Through joint transmission, quality of a received signal may be improved coherently or non-coherently and interference on other UEs may be actively eliminated.

Dynamic cell selection refers to a scheme by which a PDSCH is transmitted from one point (from among points participating in CoMP operation). That is, data is transmitted to a single UE from a single point at a specific time, other points participating in CoMP operation do not transmit data to the UE at the time, and the point that transmits the data to the UE may be dynamically selected.

According to the CS/CB scheme, points participating in CoMP operation may collaboratively perform beamforming of data transmission to a single UE. Here, user scheduling/beaming may be determined according to coordination of points participating in the corresponding CoMP operation although data is transmitted only from a serving cell.

In the case of uplink, coordinated multi-point reception refers to cooperative reception of a signal by a plurality of points geographically spaced apart from one another. CoMP schemes applicable to uplink may be classified into joint reception (JR) and coordinated scheduling/beamforming (CS/CB).

JR is a scheme by which a plurality of reception points receives a signal transmitted over a PUSCH and CS/CB is a scheme by which only a single point receives a PUSCH and scheduling/beamforming is performed.

A UE can commonly receive data from multi-cell base stations using the CoMP system. In addition, base stations can simultaneously support one or more UEs using the same radio frequency resource to improve system performance. Furthermore, a base station may perform space division multiple access (SDMA) based on information on channel state between the base station and a UE.

A serving eNB and one or more coordinating eNBs can be connected to a scheduler through a backbone network in a CoMP system. The scheduler can operate on the basis of channel information about a channel state between each UE and each coordinating eNB, measured by each eNB, fed back thereto through the backbone network. For example, the scheduler can schedule information for coordinating MIMO operation for the serving eNB and one or more coordinating eNBs. That is, the scheduler can directly instruct each eNB to perform coordinated MIMO operation.

As described above, the CoMP system can be considered as a virtual MIMO system using a plurality of transmission points grouped into one group and MIMO using multiple antennas can be applied thereto.

In systems subsequent to LTE, CoMP transmission can be implemented using carrier aggregation (CA). FIG. 11 illustrates CA based CoMP operation. Referring to FIG. 11, a primary cell PCell and a secondary cell SCell use different frequency bands or the same frequency band in the frequency domain and are allocated to two transmission points (e.g. eNBs) spaced apart from each other. Various DL/UL CoMP operations such as CS/CB, DCS, etc. can be achieved by allocating the PCell of UE1 to a serving transmission point and allocating the SCell to a neighboring transmission point causing severe interference.

While FIG. 11 shows that UE1 aggregates the two eNBs as PCell and SCell, a UE may aggregate three or more cells, some secondary cells from among the aggregated cells may perform CoMP operation in the same frequency band and other cells may perform simple CA operation in different frequency bands. In this case, PCell may not participate in the CoMP operation.

The present invention is applicable to the aforementioned CA based CoMP operation. The following terms are defined for convenience of description prior to description of the present invention.

CA set: a set of cells aggregated by a UE

CA cell: a cell belonging to a CA set

PCell: One of cells belonging to a CA set can be designated as a PCell. For example, a cell used for initial RRC connection with an eNB from among cells aggregated by a UE can be designated as a PCell. The UE can receive a physical channel for obtaining DL system information, such as a PBCH, PDCCH (in CSS), etc. through DL of the PCell and transmit a PUCCH carrying ACK/NACK, CSI feedback, etc. through UL of the PCell.

SCell: A cell which is not a PCell from among cells aggregated by a UE is referred to as an SCell.

CoMP set: Cells to which CoMP operation is applied from among cells aggregated by a UE are referred to as a CoMP set. Here, cells to which CoMP operation is applied can correspond to only cells which participate in signaling, transmission and reception for CoMP operations such as JT, DCS, CB, CS, etc. or include all candidate cells.

CoMP cell: a cell belonging to a CoMP set. Time/frequency synchronization and parameters such as the number of DL antennas/RS configuration can be independently set per CoMP cell. Accordingly, each CoMP cell can correspond to a specific set of the parameters.

CoMP PCell: one of cells belonging to a P-CoMP set. For example, the CoMP PCell can correspond to a PCell or can be configured through higher layer signaling (e.g. RRC signaling) separately from the PCell. Alternatively, the CoMP PCell can be a cell which transmits a PDCCH for scheduling PDSCH/PUSCH transmission for CoMP cells belonging to a CoMP set. A specific field in the PDCCH transmitted through the CoMP PCell can be used to transmit information that indicates a CoMP cell for which PDSCH/PUSCH transmission is scheduled. The information indicating the CoMP cell may include information that indicates carrier identification information (e.g. CIF) or a specific parameter set (e.g. RS configuration, PDSCH staring position and/or QCL (Quasi-Co-LOcaton) parameter, etc.) corresponding to the CoMP cell. For example, when CoMP cells belonging to the CoMP set are different carriers, the information indicating the CoMP cell can include carrier identification information. In addition, when the CoMP cells belonging to the CoMP set correspond to the same carrier, the information indicating the CoMP cell can include information that indicates the specific parameter set to the CoMP cell.

CoMP SCell: a cell which is not a CoMP PCell from among cells belonging to a CoMP set.

P-CoMP set: a CoMP set including a PCell from among CA sets.

P-CoMP SCell: a CoMP SCell belonging to a P-CoMP set.

In the present invention, a CoMP set for a UE may correspond to a CA set or may be included in the CA set. In addition, while the present invention assumes a case in which CoMP cells use overlapping frequency bands/carriers from the viewpoint of a UE, the present invention can be extended to other cases. Furthermore, while the present invention assumes that only one CoMP set is configured for one UE, the present invention can be applied to each CoMP set when a plurality of CoMP sets is configured for one UE. Moreover, techniques applied to CoMP transmission in the present invention can be limitedly applied to a specific interval (e.g. subframe).

In the present invention, a CoMP set may be a cell group (explicitly, "CoMP set") in which CoMP operation is performed. However, the CoMP set to which the present invention is applied may be a cell group which is grouped through higher layer signaling (e.g. RRC signaling) even if CoMP operation is not explicitly performed. Cells aggregated by a UE may constitute a cell group or some of the cells may belong to the cell group and some of the cells may not belong to the cell group.

In Rel-8/9 LTE supporting a single carrier, a maximum of one piece of DL data (which may include both a PDSCH and a PDCCH that requires ACK/NACK feedback) can be scheduled/transmitted through one subframe (SF). In CA based Rel-10 LTE-A, a maximum of one PDSCH can be scheduled/transmitted per CC/cell through one subframe. For next generation systems, it is possible to consider a method of allocating (or aggregating) CoMP sets to one UE and setting CIF cross-CC scheduling, and then indicating a CoMP cell to which DL data scheduled by a PDCCH transmitted to a CoMP PCell using a CIF field included in the PDCCH or a CoMP transmission scheme (e.g. JT, CB or CS) for the DL data in order to support CoMP operation using CA. In this case, the maximum number of PDSCHs that can be scheduled/transmitted through one subframe from the corresponding CoMP set can be one.

For reference, in FDD based Rel-10 LTE-A, it is possible to apply a method of using only a TPC (Transmit Power Control) field in a PDCCH that schedules a PCell for PUCCH power control and using TPC field in a PDCCH that schedules an SCell as an ARI (ACK/NACK Resource Indicator) indicating a resource to be used for ACK/NACK transmission from among PUCCH format-3 resources allocated through RRC (Radio Resource Control) signaling when PUCCH format 3 is set for ACK/NACK transmission. Similarly, in TDD based Rel-10 LTE-A, it is possible to apply a method of using only TPC field in a PDCCH, which schedules a PCell and has a DAI (Downlink Assignment Index) corresponding to an initial value (e.g. 1), for PUCCH power control and using TPC fields in the remaining PDCCHs (i.e. a PDCCH scheduling a PCell and having a DAI that is not an initial value and a PDCCH scheduling an SCell) as an ARI indicating one of a plurality of PUCCH formats 3 allocated through higher layer signaling (e.g. RRC signaling) when PUCCH format 3 is set for ACK/NACK transmission.

ACK/NACK Transmission when PUCCH Format 3 is Set in an FDD System

When only a PDCCH scheduling a PCell is received, ACK/NACK transmission can be performed through an implicit PUCCH (format 1a/1b) linked to the PDCCH. When only the PDCCH scheduling the PCell and a single PDSCH is received on the PCell, ACK/NACK for the PDSCH can be transmitted using PUCCH format 1a/1b although PUCCH format 3 has been set. In this case, the corresponding PUCCH can be defined as a fallback PUCCH.

When at least one PDCCH scheduling an SCell is received, ACK/NACK transmission can be performed through PUCCH format 3 which is allocated through higher layer signaling (e.g. RRC signaling) and determined by an ARI.

ACK/NACK Transmission when PUCCH Format 3 is Set in a TDD System

When only a PDCCH that schedules a PCell and has a DAI corresponding to an initial value is received, ACK/NACK transmission can be performed through an implicit PUCCH (format 1a/1b) linked to the PDCCH. When only a PDCCH that schedules a PCell and has a DAI corresponding to an initial value is received and a single PDSCH is received on the PCell, ACK/NACL for the PDSCH can be transmitted using PUCCH format 1a/1b although PUCCH format 3 has been set. In this case, the corresponding PUCCH can be defined as a fallback PUCCH.

When at least one of a PDCCH scheduling a PCell and having a DAI that is not an initial value and a PDCCH scheduling an SCell is received, ACK/NACK transmission can be performed through PUCCH format 3 which is allocated through higher layer signaling (e.g. RRC signaling) and determined by an ARI.

TDD CA based Rel-10 LTE-A considers signaling a DAI value defined as follows using a DAI field in a PDCCH that schedules DL data for each CC similarly to the conventional Rel-8/9 TDD system. Here, the DAI value can start with 0, 1 or an arbitrary number. It is assumed that the DAI value starts at 1 for convenience.

The DAI is information indicating a DL data sequence scheduled based on DL subframe sequence. The DL data order may be a sequence including a PDSCH (e.g. SPS (Semi-Persistent Scheduling) PDSCH) transmitted without a PDCCH or a sequence that does not include the PDSCH. For example, when the PDSCH is scheduled through DL subframes #1 and #3, a DAI value in a PDCCH that schedules the PDSCH can be signaled as 1 and 2. When the number of DL subframes for which ACK/NACK feedback is transmitted in one UL subframe is M in TDD, modulo-4 operation can be applied to the DAI value as follows when up to M=9 is considered based on a 2-bit DAI field.

DAI-counter of a first, fifth or ninth scheduled PDSCH or DL grant PDCCH=1

DAI-counter of a second or sixth scheduled PDSCH or DL grant PDCCH=2

DAI-counter of a third or seventh scheduled PDSCH or DL grant PDCCH=3

DAI-counter of a fourth or eighth scheduled PDSCH or DL grant PDCCH=4

When channel selection is set for ACK/NACK transmission in FDD and TDD based Rel-10 LTE-A, only the TPC field in a PDCCH scheduling a PCell can be used for PUCCH power control and the TPC field in a PDCCH scheduling an SCell can be used for an ARI that indicates one of a plurality of explicit PUCCH (format 1b) resources (or resource sets) allocated through higher layer signaling (e.g. RRC signaling) in the case of non-cross-CC scheduling. In the case of cross-CC scheduling, the TPC field is not used/defined for any purpose. Specifically, the following PUCCH resource allocation method can be considered according to cross-CC scheduling or non-cross-CC scheduling (and M in the case of TDD).

ACK/NACK Transmission when Channel Selection is Set in FDD

In the case of cross-CC scheduling

ACK/NACK transmission can be performed through one or two implicit PUCCH resources linked to a PDCCH scheduling a PCell (the number of resources may equal the maximum number of transport blocks (TBs) that can be transmitted through the PCell) or one or more implicit PUCHC resources linked to a PDCCH scheduling an SCell (the number of resources may equal the maximum number of TBs that can be transmitted through the SCell). In this case, the implicit PUCCH resource linked to the PCell scheduling PDCCH can be defined as a fallback PUCCH.

In the case of non-cross-CC scheduling

ACK/NACK transmission can be performed through one or two implicit PUCCH resources linked to a PDCCH scheduling a PCell (the number of resources may equal the maximum number of TBs that can be transmitted through the PCell) or one or more explicit PUCHC resources (the number of resources may equal the maximum number of TBs that can be transmitted through an SCell) allocated through higher layer signaling (e.g. RRC signaling) and determined by an ARI.

ACK/NACK Transmission when Channel Selection is Set in TDD

In the case of cross-CC scheduling

M=1

ACK/NACK transmission can be performed through one of one or two implicit PUCCH resources linked to a PDCCH scheduling a PCell (the number of resources may equal the maximum number of transport blocks (TBs) that can be transmitted through the PCell) and one or more implicit PUCHC resources linked to a PDCCH scheduling an SCell (the number of resources may equal the maximum number of TBs that can be transmitted through the SCell). In this case, an implicit PUCCH resource linked to the PCell scheduling PDCCH can be defined as a fallback PUCCH.

M=2

ACK/NACK transmission can be performed through one of an implicit PUCCH resource linked to a PDCCH that schedules a first DL subframe of a PCell, an implicit PUCCH resource linked to a PDCCH that schedules a second DL subframe of the PCell, an implicit PUCCH resource linked to a PDCCH that schedules a first DL subframe of an SCell and an implicit PUCCH resource linked to a PDCCH that schedules a second DL subframe of the SCell. In this case, the implicit PUCCH resources linked to the PDCCHs that respectively schedule the first and second DL subframes of the PCell can be defined as fallback PUCCHs.

M=3

ACK/NACK transmission can be performed through one of an implicit PUCCH resource linked to a PDCCH that schedules a PCell and has DAI=1, an implicit PUCCH resource linked to a PDCCH that schedules a PCell and has DAI=2, an implicit PUCCH resource linked to a PDCCH that schedules an SCell and has DAI=1 and an implicit PUCCH resource linked to a PDCCH that schedules an SCell and has DAI=2. In this case, the implicit PUCCH resource linked to the PDCCH scheduling the PCell and having DAI=1 or 2 can be defined as a fallback PUCCH.

M=4 corresponding to the case of M=3

In the case of non-cross-CC scheduling

M=1

ACK/NACK transmission can be performed through one of one or two implicit PUCCH resources linked to a PDCCH scheduling a PCell (the number of resources may equal the maximum number of TBs that can be transmitted through the PCell) and one or more implicit PUCCH resources (the number of resources may equal the maximum number of TBs that can be transmitted through the SCell) allocated through higher layer signaling (e.g. RRC signaling) and determined by an ARI.

M=2

ACK/NACK transmission can be performed through one of an implicit PUCCH resource linked to a PDCCH that schedules a first DL subframe of a PCell, an implicit PUCCH resource linked to a PDCCH that schedules a second DL subframe of the PCell and two explicit PUCCH resources allocated through higher layer signaling (e.g. RRC signaling) and determined by an ARI.

M=3

ACK/NACK transmission can be performed through one of an implicit PUCCH resource linked to a PDCCH that schedules a PCell and has DAI=1, an implicit PUCCH resource linked to a PDCCH that schedules a PCell and has DAI=2 and two explicit PUCCH resources allocated through higher layer signaling (e.g. RRC signaling) and determined by an ARI.

M=4 corresponding to the case of M=3

The present invention provides ACK/NACK feedback related signaling and ACK/NACK transmission resource allocation methods for a case in which a P-CoMP set is included in a CA set of a UE on the basis of the aforementioned ACK/NACK feedback transmission and CA based CoMP scheme. Specifically, the present invention proposes a method for determining information signaled through a TPC field in a PDCCH and a fallback PUCCH resource corresponding to the PDCCH according to duplex mode (FDD or TDD) and ACK/NACK mode (PUCCH format 3 or channel selection). In the proposed method, the determined fallback PUCCH resource with respect to each condition can replace the above-defined fallback PUCCH resource.

The present invention regards a single CoMP set as a single CC in Rel-10 CA and applies single DAI signaling to the CoMP set (CoMP cell belonging thereto). For example, it is assumed that a specific CoMP set is composed of CoMP cells C1, C2 and C3 when M=4. In this case, even when DL data scheduled through DL subframes #1→#2→#3→#4 is transmitted through different CoMP cells C2→C1→C2→C3 by applying DCS, DAI values of PDCCHs that schedule the DL data can be sequentially signaled as 1→2→3→4 (as if all DL data is transmitted through a single CC (in Rel-10 CA)). Here, the CoMP cells C1, C2 and C3 may have the same carrier frequency or different carrier frequencies.

The method for determining information signaled through the TPC field in a PDCCH and a fallback PUCCH resource corresponding to the PDCCH according to duplex mode (FDD or TDD) and ACK/NACK mode (PUCCH format 3 or channel selection) is arranged as follows.

ACK/NACK Transmission when PUCCH Format 3 is Set in FDD

Signaling information of TPC field

A TPC field included in a PDCCH that schedules a P-CoMP set (an arbitrary CoMP cell belonging thereto) can be used for PUCCH power control. In this case, a TPC field included in a PDCCH that schedules a P-CoMP SCell is used for power control rather than being used as an ARI even though a target cell is the SCell.

A TPC field included in a PDCCH scheduling an SCell that does not belong to the P-CoMP set (CoMP cell belonging thereto) can be used as an ARI to determine an explicit PUCCH resource according to the conventional method.

Fallback PUCCH resource determination

ACK/NACK transmission can be performed through an implicit PUCCH (format 1a/1b) resource linked to a PDCCH that schedules a P-CoMP set (an arbitrary CoMP cell belonging thereto). In this case, a PDCCH that schedules a P-CoMP SCell can be used to determine a fallback PUCCH resource even when a target cell is the SCell.

For example, if only a PDCCH scheduling an SCell belonging to the P-CoMP set is received and a single PDSCH is received through the SCell, ACK/NACK transmission can be performed through a PUCCH resource (e.g. $n^{(1)}_{PUCCH=nCCE+N^{(1)}_{PUCCH}}$) linked to the lowest CCE index used to transmit the PDCCH.

ACK/NACK Transmission when PUCCH Format 3 is Set in TDD

Signaling information of TPC field

A TPC field included in a PDCCH that schedules a P-CoMP set (an arbitrary CoMP cell belonging thereto including a P-CoMP SCell) and has a DAI corresponding to an initial value (e.g. 1) can be used for PUCCH power control.

A TPC field included in a PDCCH scheduling a P-CoMP set (an arbitrary CoMP cell belonging thereto) and having a DAI that is not an initial value or a TPC field included in a PDCCH scheduling an SCell that does not belong to the P-CoMP set can be used as an ARI to determine an explicit PUCCH resource according to the conventional method.

Fallback PUCCH resource determination

ACK/NACK transmission can be performed through an implicit PUCCH (format 1a/1b) resource linked to a PDCCH that schedules a P-CoMP set (an arbitrary CoMP cell belonging thereto including a P-CoMP SCell) and has a DAI corresponding to an initial value (e.g. 1). In this case, a PDCCH that schedules an SCell belonging to the P-CoMP set can be used to determine a fallback PUCCH resource even when a target cell is the SCell.

For example, if a PDCCH that schedules an SCell belonging to the P-CoMP set and has a DAI corresponding to 1 is received and a single PDSCH is received through the SCell, ACK/NACK transmission can be performed through a PUCCH resource (e.g. $n^{(1)}_{PUCCH=nCCE+N^{(1)}_{PUCCH}}$) linked to the lowest CCE index used to transmit the PDCCH.

ACK/NACK Transmission when Channel Selection Mode is Set in FDD

Signaling information of TPC field

A TPC field included in a PDCCH that schedules a P-CoMP set (an arbitrary CoMP cell belonging thereto) can be used for PUCCH power control. In this case, a TPC field included in a PDCCH that schedules a P-CoMP SCell is used for power control rather than being used as an ARI or being in an unused/unspecified state even though a target cell is the SCell.

A TPC field included in a PDCCH scheduling an SCell that does not belong to the P-CoMP set (CoMP cell belonging thereto) can be used as an ARI to determine an explicit PUCCH resource according to the conventional method.

Fallback PUCCH resource determination

ACK/NACK transmission can be performed through one of one (e.g. $n^{(1)}_{PUCCH=nCCE+N^{(1)}PUCCH}$) or two (e.g. $n^{(1)}_{PUCCH=nCCE+N^{(1)}PUCCH}$; $n^{(1)}_{PUCCH=nCCE+N^{(1)}PUCCH+1}$) implicit PUCCH resources linked to a PDCCH that schedules a P-CoMP set (an arbitrary CoMP cell belonging thereto). Here, the number of resources may equal the maximum number of TBs that can be transmitted through the P-CoMP set (an arbitrary CoMP cell belonging thereto) in a single DL subframe.

Even in this case, a PDCCH that schedules an SCell belonging to the P-CoMP set can be used to determine a fallback PUCCH resource even though the target cell is the SCell. For example, if ACK or NACK is set for the SCell belonging to the P-CoMP set and NACK/DTX is set for other cells that do not belong to the P-CoMP set, ACK/NACK transmission can be performed through one of implicit PUCCH resources linked to the PDCCH that schedules the SCell belonging to the P-CoMP set.

ACK/NACK Transmission when Channel Selection Mode is Set in TDD

Signaling information of TPC field

A TPC field included in a PDCCH that schedules a P-CoMP set (an arbitrary CoMP cell belonging thereto) can be used for PUCCH power control. Accordingly, a TPC field included in a PDCCH that schedules a P-CoMP SCell is used for power control rather than being used as an ARI or being in an unused/unspecified state even though a target cell is the SCell.

A TPC field included in a PDCCH scheduling an SCell that does not belong to the P-CoMP set (CoMP cell belonging thereto) can be used as an ARI to determine an explicit PUCCH resource according to the conventional method.

Fallback PUCCH resource determination

M=1

ACK/NACK transmission can be performed through one or two implicit PUCCH resources linked to a PDCCH that schedules a P-CoMP set (an arbitrary CoMP cell belonging thereto). Accordingly, a PDCCH that schedules an SCell belonging to the P-CoMP set can be used to determine a fallback PUCCH resource even though the target cell is the SCell. The number of resources may equal the maximum number of TBs that can be transmitted through the P-CoMP set (an arbitrary CoMP cell belonging thereto) in a single DL subframe.

M=2

ACK/NACK transmission can be performed through one of an implicit PUCCH resource linked to a PDCCH that schedules a first DL subframe of a P-CoMP set (an arbitrary CoMP cell belonging thereto) and an implicit PUCCH resource linked to a PDCCH that schedules a second DL subframe of the P-CoMP set (an arbitrary CoMP cell belonging thereto). A PDCCH that schedules an SCell belonging to the P-CoMP set can be used to determine a fallback PUCCH resource even though the target cell is the SCell.

M=3

ACK/NACK transmission can be performed through one of an implicit PUCCH resource linked to a PDCCH that schedules a P-CoMP set while having DAI=1 and an implicit PUCCH resource linked to a PDCCH that schedules a P-CoMP set while having DAI=2. A PDCCH that schedules an SCell belonging to the P-CoMP set can be used to determine a fallback PUCCH resource even though the target cell is the SCell.

M=4 corresponding to the case of M=3

While a fallback PUCCH corresponding to a PDCCH scheduling an SCell belonging to a P-CoMP set has been allocated as an implicit resource in the above description, the fallback PUCCH may be allocated as an explicit PUCCH resource through higher layer signaling (e.g. RRC signaling).

Figure 12:
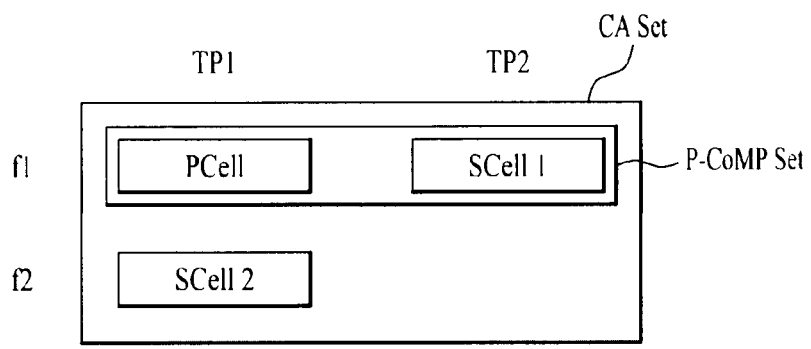
FIG. 12 illustrates a method for transmitting control information when a P-CoMP set and an SCell are aggregated according to the present invention.

FIG. 12 illustrates a method for transmitting control information when a P-CoMP set and an SCell are aggregated according to the present invention.

Referring to FIG. 12, a PCell in a first frequency band f1 and SCell2 in a second frequency band f2 in a first transmission point TP1 are aggregated to configure a CA set in a UE. In addition, a P-CoMP set may be configured using the PCell of TP1 and SCell1 configured in a second transmission point TP2 in the same frequency band f1 for CoMP operation. Then, the P-CoMP set and SCell2 may be aggregated and operate in the UE.

When it is assumed that the UE operates in DCS in the example shown in FIG. 12, the PCell and SCell2 can be aggregated and operate in subframe #n and SCell1 and SCell2 can be aggregated and operate in subframe #n+k. Since the PCell and another SCell (i.e. SCell2) are aggregated in subframe #n, the conventional method can be employed. That is, the TPC field included in the PDCCH that schedules the PCell can be used for power control and the TPC field included in the PDCCH that schedules SCell2 can be used as an ARI to determine an explicit PUCCH resource. In addition, when only the PDCCH scheduling PCell is received, ACK/NACK can be transmitted by falling back to an implicit PUCCH resource (PUCCH format 1a/1b) linked to the PDCCH even if PUCCH format 3 is set.

An SCell (i.e. SCell1) belonging to the P-CoMP set and an SCell (i.e. SCell 2) that does not belong to the P-CoMP set can be aggregated and operate in subframe #n+k. In this case, the TPC field included in the PDCCH that schedules SCells belonging to the P-CoMP set is used for power control rather than being used as an ARI even though the target cell is the SCell. The TPC field included in the PDCCH scheduling SCell2 that does not belong to the P-CoMP set can be used as an ARI to determine an explicit PUCCH resource. In addition, when only the PDCCH scheduling SCell2 is received (FDD) or only a PDCCH scheduling SCell1 while having DAI=1 (TDD), the PDCCH scheduling SCell1 can be used to determine a fallback PUCCH resource even though SCell1 is a secondary cell. That is, ACK/NACK transmission can be performed through an implicit PUCCH resource (e.g. PUCCH format 1a/1b) linked to the corresponding PDCCH even if PUCCH format 3 is set for each case. In addition, the PDCCH scheduling SCell1 can be used to determine a fallback PUCCH resource even when channel selection mode is set.

Figure 13:
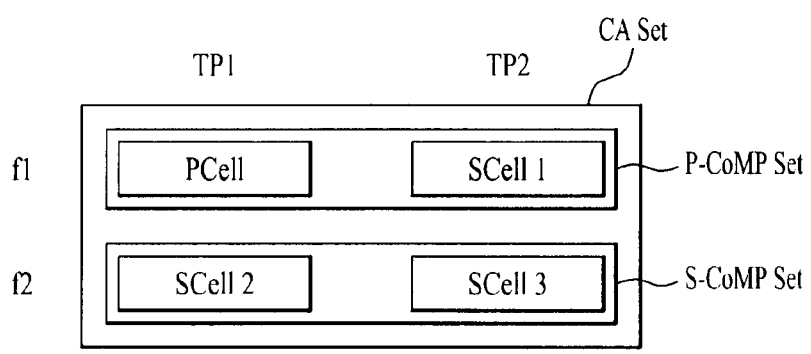
FIG. 13 illustrates a method for transmitting control information when a P-CoMP set and an S-CoMP set are aggregated according to the present invention.

FIG. 13 illustrates a method for transmitting control information when a P-CoMP set and an S-CoMP set are aggregated according to the present invention.

Referring to FIG. 13, a PCell in a first frequency band f1 and SCell2 in a second frequency band f2 in a first transmission point TP1 may be aggregated to configure a CA set in a UE. In addition, a P-CoMP set may be configured using the PCell of TP1 and SCell1 configured in a second transmission point TP2 in the same frequency band f1 for CoMP operation. Furthermore, an S-CoMP set may be configured using SCell2 of TP1 and SCell 3 configured in TP2 in the same frequency band f2 for CoMP operation. Then, the P-CoMP set and the S-CoMP set may be aggregated and operate in the UE.

When it is assumed that the UE operates in DCS in the example shown in FIG. 13, the PCell and SCell2 (or SCell3) can be aggregated and operate in subframe #n and SCell1 and SCell2 (or SCell3) can be aggregated and operate in subframe #n+k. When it is assumed that SCell1 and SCell2 (or SCell3) belonging to the P-COMP set are aggregated and operate in subframe #n+k, the same operation as that illustrated in FIG. 12 can be performed. That is, the present invention can be equally applied to a case in which the P-CoMP set and the S-CoMP set are aggregated and operate.

Figure 14:
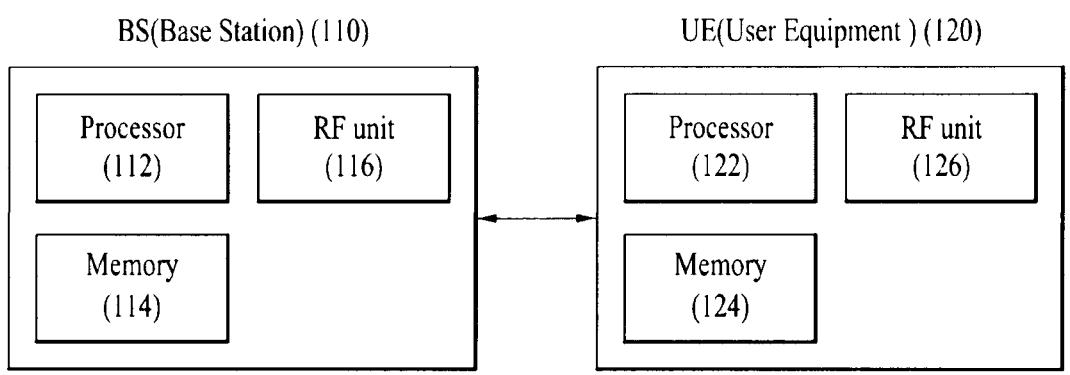
FIG. 14 illustrates an eNB and a UE to which the present invention is applicable.

FIG. 14 illustrates a BS and a UE to which the present invention is applicable.

Referring to FIG. 14, a wireless communication system includes a BS 110 and a UE 120. When the wireless communication system includes a relay, the BS or UE can be replaced by the relay.

The BS 110 may include a processor 112, a memory 114 and a radio frequency (RF) unit 116. The processor 112 may be configured to implement procedures and/or methods proposed by the present invention. The memory 114 may be connected to the processor 112 and store information related to operations of the processor 112. The RF unit 116 may be connected to the processor 112 and transmit and/or receive RF signals. The UE 120 may include a processor 122, a memory 124 and an RF unit 126. The processor 122 may be configured to implement procedures and/or methods proposed by the present invention. The memory 124 may be connected to the processor 122 and store information related to operations of the processor 122. The RF unit 126 may be connected to the processor 122 and transmit and/or receive RF signals.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc. The term terminal may be replaced with the terms UE, MS, Mobile Subscriber Station (MSS), etc.

The embodiments of the present invention may be achieved by various means, for example, hardware, firmware, software, or a combination thereof. In a hardware configuration, an embodiment of the present invention may be achieved by one or more ASICs, DSPs, DSDPs, PLDs, FPGAs, processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be used for wireless communication apparatuses such as a UE, eNB, etc.

The invention claimed is:

1. A method for transmitting uplink control information by a user equipment (UE) configured with a coordinated multi-point (CoMP) set including a plurality of cells in a carrier aggregation (CA) based wireless communication system, the method comprising:
   receiving a physical downlink control channel (PDCCH) signal for downlink scheduling;
   receiving a physical downlink shared channel (PDSCH) signal corresponding to the PDCCH signal on a secondary cell (SCell); and
   transmitting reception response information with respect to the PDSCH signal via a physical uplink control channel (PUCCH),
   wherein, when the CoMP set includes a primary cell (PCell) and the SCell, a resource for the PUCCH is given using an index for a specific resource unit from among one or more resource units used to transmit the PDCCH signal,
   wherein, when the CoMP set includes the SCell without the PCell, the resource for the PUCCH is given using a value of a specific field included in the PDCCH signal.

2. The method according to claim 1, wherein the specific field is a transmit power control (TPC) field and, when the SCell does not belong to the CoMP set having the PCell, the specific field indicates an ACK/NACK resource indicator (ARI) value.

3. The method according to claim 1, wherein, when the SCell belongs to the CoMP set having the PCell, a TPC field included in the PDCCH that schedules the SCell includes power control information.

4. The method according to claim 1, wherein, when the SCell belongs to the CoMP set having the PCell and reception response information with respect to one PDSCH signal transmitted on the SCell is transmitted, the number of resources for the PUCCH equals a maximum number of transport blocks that can be transmitted in one downlink subframe through the CoMP set having the PCell.

5. The method according to claim 1, wherein, when the SCell belongs to the CoMP set having the PCell and reception response information with respect to one or more PDSCH signals transmitted on the SCell is transmitted, resources for the PUCCH include a PUCCH resource related to a PDCCH signal scheduling a first downlink subframe of the SCell and a PUCCH resource related to a PDCCH signal scheduling a second downlink subframe of the SCell.

6. The method according to claim 1, wherein, when the SCell belongs to the CoMP set having the PCell and reception response information with respect to one or more PDSCH signals transmitted on the SCell is transmitted, resources for the PUCCH include a PUCCH resource related to a PDCCH signal scheduling the SCell and having a downlink association index (DAI) of 1 and a PUCCH resource related to a PDCCH signal scheduling the SCell and having a DAI of 2.

7. A user equipment (UE) configured with a coordinated multi-point (CoMP) set including a plurality of cells in a carrier aggregation (CA) based wireless communication system, the UE comprising:
- a radio frequency (RF) module; and
- a processor,
    wherein the processor is configured to receive a PDCCH signal for downlink scheduling through the RF module, to receive a PDSCH signal corresponding to the PDCCH signal on a secondary cell (SCell) through the RF module, and to transmit reception response information with respect to the PDSCH signal via a PUCCH through the RF module,
    wherein, when the CoMP set includes a primary cell (PCell) and the SCell, a resource for the PUCCH is given using an index for a specific resource unit from among one or more resource units used to transmit the PDCCH signal,
    wherein, when the CoMP set includes the SCell without the PCell, the resource for the PUCCH is given using a value of a specific field included in the PDCCH signal.

8. The UE according to claim 7, wherein the specific field is a transmit power control (TPC) field and, when the SCell does not belong to the CoMP set having the PCell, the specific field indicates an ACK/NACK resource indicator (ARI) value.

9. The UE according to claim 7, wherein, when the SCell belongs to the CoMP set having the PCell, a TPC field included in the PDCCH that schedules the SCell includes power control information.

10. The UE according to claim 7, wherein, when the SCell belongs to the CoMP set having the PCell and reception response information with respect to one PDSCH signal transmitted on the SCell is transmitted, the number of resources for the PUCCH equals a maximum number of transport blocks that can be transmitted in one downlink subframe through the CoMP set having the PCell.

11. The UE according to claim 7, wherein, when the SCell belongs to the CoMP set having the PCell and reception response information with respect to one or more PDSCH signals transmitted on the SCell is transmitted, resources for the PUCCH include a PUCCH resource related to a PDCCH signal scheduling a first downlink subframe of the SCell and a PUCCH resource related to a PDCCH signal scheduling a second downlink subframe of the SCell.

12. The UE according to claim 7, wherein, when the SCell belongs to the CoMP set having the PCell and reception response information with respect to one or more PDSCH signals transmitted on the SCell is transmitted, resources for the PUCCH include a PUCCH resource related to a PDCCH signal scheduling the SCell and having a downlink association index (DAI) of 1 and a PUCCH resource related to a PDCCH signal scheduling the SCell and having a DAI of 2.

13. The method according to claim 1, wherein the PCell is a cell used for the user equipment to establish an initial connection or re-establish a connection, and the SCell is a cell other than the PCell.

14. The UE according to claim 7, wherein the PCell is a cell used for the user equipment to establish an initial connection or re-establish a connection, and the SCell is a cell other than the PCell.

* * * * *